US012634564B2

(12) United States Patent (10) Patent No.: US 12,634,564 B2
Spears (45) Date of Patent: May 19, 2026

(54) METHOD AND SYSTEM FOR DELIVERY OF CONTENT OVER COMMUNICATION NETWORKS

(71) Applicant: IPAR, LLC, San Francisco, CA (US)

(72) Inventor: Joseph L. Spears, Hayward, CA (US)

(73) Assignee: IPAR, LLC, San Francisco, CA (US)

( * ) Notice: Subject to any disclaimer, the term of this patent is extended or adjusted under 35 U.S.C. 154(b) by 39 days.

(21) Appl. No.: 18/482,936

(22) Filed: Oct. 9, 2023

(65) Prior Publication Data

US 2024/0040212 A1 Feb. 1, 2024

Related U.S. Application Data

(63) Continuation of application No. 17/358,133, filed on Jun. 25, 2021, now Pat. No. 11,800,204, which is a
(Continued)

(51) Int. Cl.
*H04N 21/858* (2011.01)
*G06F 15/02* (2006.01)
(Continued)

(52) U.S. Cl.
CPC ....... *H04N 21/858* (2013.01); *G06F 15/0291* (2013.01); *H04N 21/237* (2013.01);
(Continued)

(58) Field of Classification Search
CPC ............... H04N 21/858; H04N 21/237; H04N 21/4316; H04N 21/4622; H04N 21/4722;
(Continued)

(56) References Cited

U.S. PATENT DOCUMENTS 2,762,914 A * 9/1956 Peterson .................. H03K 5/01
327/28
5,664,133 A 9/1997 Malamud et al.
(Continued)

FOREIGN PATENT DOCUMENTS

WO WO 2008/094616 8/2008

OTHER PUBLICATIONS

Mystrands, Inc.; Mystrands Discovery for Windows; www.mystrands.com; 2006.
(Continued)

*Primary Examiner* — Sahar Aqil Riaz
(74) *Attorney, Agent, or Firm* — Jones Day

(57) ABSTRACT

Systems and methods are provided for providing content to a user via communications between a content provider and a user Systems and methods include providing a plurality of pre-existing content items to a system; and using the system, controlling transmission of sub-portions of content to a user presentation device based on received control signals, said controlling including generating dynamic content as a result of received control signals and user created content received from the user, where said controlling further includes detecting that particular user created content is irrelevant, generating the dynamic content based on a determination that the particular user created content is irrelevant, and editing the dynamic content to incorporate the particular user created content despite the particular user created content being deemed irrelevant.

5 Claims, 32 Drawing Sheets

FIG. 1B

Related U.S. Application Data continuation of application No. 16/407,809, filed on May 9, 2019, now Pat. No. 11,051,085, which is a continuation of application No. 15/814,484, filed on Nov. 16, 2017, now Pat. No. 10,334,329, which is a continuation of application No. 15/232,920, filed on Aug. 10, 2016, now Pat. No. 9,832,541, which is a continuation of application No. 12/868,249, filed on Aug. 25, 2010, now Pat. No. 9,432,746.

(51) Int. Cl.

| | |
|---|---|
| H04N 21/237 | (2011.01) |
| H04N 21/431 | (2011.01) |
| H04N 21/462 | (2011.01) |
| H04N 21/4722 | (2011.01) |
| H04N 21/475 | (2011.01) |
| H04N 21/4786 | (2011.01) |
| H04N 21/4788 | (2011.01) |
| H04N 21/61 | (2011.01) |
| H04N 21/854 | (2011.01) |
| H04N 21/8541 | (2011.01) |

(52) U.S. Cl.
CPC ..... *H04N 21/4316* (2013.01); *H04N 21/4622* (2013.01); *H04N 21/4722* (2013.01); *H04N 21/4758* (2013.01); *H04N 21/4786* (2013.01); *H04N 21/4788* (2013.01); *H04N 21/6106* (2013.01); *H04N 21/6137* (2013.01); *H04N 21/854* (2013.01); *H04N 21/8541* (2013.01)

(58) Field of Classification Search
CPC ........... H04N 21/4758; H04N 21/4786; H04N 21/4788; H04N 21/6106; H04N 21/6137; H04N 21/854; H04N 21/8541; G06F 15/0291
USPC ........................................................ 725/116
See application file for complete search history.

(56) References Cited

U.S. PATENT DOCUMENTS

| | | | |
|---|---|---|---|
| 5,737,527 A | 4/1998 | Shiels et al. | |
| 5,802,361 A | 9/1998 | Wang et al. | |
| 6,148,173 A | 11/2000 | Bell | |
| 6,633,741 B1 | 10/2003 | Posa et al. | |
| 7,136,853 B1 | 11/2006 | Kohda et al. | |
| 7,464,058 B2 | 12/2008 | Yen et al. | |
| 7,806,329 B2 | 10/2010 | Dmitriev et al. | |
| 8,255,293 B1* | 8/2012 | Davies | G06Q 30/0251 |
| | | | 705/14.72 |
| 8,280,827 B2* | 10/2012 | Muller | H04N 21/812 |
| | | | 706/11 |
| 8,484,027 B1 | 7/2013 | Murphy | |
| 10,070,191 B2* | 9/2018 | Perinchery | H04N 21/4782 |
| 10,390,105 B1* | 8/2019 | Nijim | H04N 21/8133 |
| 2002/0099552 A1 | 7/2002 | Rubin et al. | |
| 2002/0120501 A1 | 8/2002 | Bell et al. | |
| 2002/0184314 A1 | 12/2002 | Riise | |
| 2003/0191648 A1 | 10/2003 | Knott et al. | |
| 2004/0010797 A1 | 1/2004 | Vogel | |
| 2004/0016809 A1 | 1/2004 | Song | |
| 2004/0093279 A1 | 5/2004 | Yamanoue et al. | |
| 2005/0039107 A1* | 2/2005 | Hander | G06F 40/56 |
| | | | 715/256 |
| 2005/0131762 A1 | 6/2005 | Bharat et al. | |
| 2005/0187437 A1* | 8/2005 | Matsugu | A61B 5/16 |
| | | | 128/920 |
| 2005/0188051 A1* | 8/2005 | Sneh | G06F 9/44526 |
| | | | 709/213 |
| 2005/0214730 A1 | 9/2005 | Rines | |
| 2006/0020596 A1 | 1/2006 | Liu et al. | |
| 2006/0073444 A1 | 4/2006 | Rines | |
| 2006/0235723 A1 | 10/2006 | Millard | |
| 2006/0278064 A1 | 12/2006 | Lourdeaux | |
| 2007/0005795 A1* | 1/2007 | Gonzalez | G06F 16/40 |
| | | | 375/E7.006 |
| 2007/0073596 A1 | 3/2007 | Alexander et al. | |
| 2007/0106551 A1 | 5/2007 | McGucken | |
| 2007/0117079 A1 | 5/2007 | Budlow et al. | |
| 2007/0156594 A1 | 7/2007 | McGucken | |
| 2007/0169165 A1 | 7/2007 | Crull et al. | |
| 2007/0199041 A1* | 8/2007 | Noll | H04N 21/8126 |
| | | | 348/E7.071 |
| 2007/0204308 A1 | 8/2007 | Nicholas et al. | |
| 2007/0214179 A1 | 9/2007 | Hoang | |
| 2007/0288308 A1 | 12/2007 | Chen et al. | |
| 2008/0034329 A1 | 2/2008 | Posner et al. | |
| 2008/0040475 A1 | 2/2008 | Bosworth et al. | |
| 2008/0066099 A1 | 3/2008 | Brodersen et al. | |
| 2008/0071688 A1 | 3/2008 | Corbett et al. | |
| 2008/0090513 A1 | 4/2008 | Collins et al. | |
| 2008/0114750 A1 | 5/2008 | Saxena et al. | |
| 2008/0201225 A1 | 8/2008 | Maharajh et al. | |
| 2008/0201452 A1* | 8/2008 | Athas | H04L 67/5651 |
| | | | 709/219 |
| 2008/0235216 A1 | 9/2008 | Ruttenberg | |
| 2008/0320126 A1 | 12/2008 | Drucker et al. | |
| 2009/0037355 A1* | 2/2009 | Brave | G06F 16/9535 |
| | | | 706/45 |
| 2009/0119693 A1 | 5/2009 | Higgins et al. | |
| 2009/0197681 A1 | 8/2009 | Krishnamoorthy et al. | |
| 2009/0199227 A1 | 8/2009 | Kennedy | |
| 2009/0217036 A1 | 8/2009 | Irwin et al. | |
| 2009/0228798 A1 | 9/2009 | Kephart et al. | |
| 2009/0240586 A1 | 9/2009 | Ramer et al. | |
| 2010/0035589 A1* | 2/2010 | Wormald | H04M 1/72448 |
| | | | 455/414.1 |
| 2010/0037149 A1 | 2/2010 | Heath | |
| 2010/0058485 A1 | 3/2010 | Gonzalez | |
| 2010/0086283 A1 | 4/2010 | Ramachandran et al. | |
| 2010/0094878 A1 | 4/2010 | Soroca et al. | |
| 2010/0205628 A1* | 8/2010 | Davis | H04N 21/472 |
| | | | 455/414.1 |
| 2010/0263005 A1* | 10/2010 | White | H04N 7/17318 |
| | | | 709/206 |
| 2010/0281179 A1* | 11/2010 | Istavan | H04N 21/25891 |
| | | | 707/752 |
| 2011/0063415 A1* | 3/2011 | Gefen | H04N 21/8133 |
| | | | 348/42 |
| 2011/0115977 A1* | 5/2011 | Simpson | H04N 21/6112 |
| | | | 725/62 |
| 2011/0119726 A1 | 5/2011 | Delorme et al. | |
| 2011/0145719 A1 | 6/2011 | Chen et al. | |
| 2011/0153047 A1 | 6/2011 | Cameron et al. | |
| 2011/0154404 A1* | 6/2011 | Piepenbrink | H04N 21/4622 |
| | | | 725/62 |
| 2011/0219394 A1 | 9/2011 | Lueth et al. | |
| 2011/0246574 A1 | 10/2011 | Lento et al. | |
| 2011/0265113 A1 | 10/2011 | Apfel et al. | |
| 2011/0289084 A1 | 11/2011 | Fisher | |
| 2011/0289535 A1* | 11/2011 | Saffari | G06Q 30/0241 |
| | | | 725/61 |
| 2012/0001923 A1 | 1/2012 | Weinzimmer et al. | |
| 2012/0032783 A1 | 2/2012 | Ahn et al. | |
| 2012/0089996 A1 | 4/2012 | Ramer et al. | |
| 2012/0124029 A1* | 5/2012 | Kant | G06F 16/489 |
| | | | 707/715 |
| 2012/0131171 A1 | 5/2012 | Samuel et al. | |
| 2012/0136812 A1 | 5/2012 | Brdiczka | |
| 2013/0198642 A1* | 8/2013 | Carney | H04N 21/47217 |
| | | | 715/738 |

(56)        References Cited

U.S. PATENT DOCUMENTS

2015/0334460 A1* 11/2015 Stern .................. H04N 21/4722
                                                            725/32
2016/0094875 A1*  3/2016 Peterson ............ H04N 21/4312
                                                            725/41

OTHER PUBLICATIONS

Pereira, Fernando, Vetro, Anthony, Sikora, Thomas; Multimedia Retrieval and Delivery; Essential Metadata Challenges and Standards; Proceedings of the IEEE, 96(4); pp. 721-744; 2008.
International Search Report and Written Opinion of the International Searching Authority; PCT/US2011/022865; Apr. 2011.
Written Opinion of the International Searching Authority; PCT/US2011/022871; 2012.
Digital Video Broadcasting; Content Protection and Copy Management; pp. 1-103; 2005.

Muhlbauer, Adam, Safavi-Naini, Reihaneh, Salim, Farzad, Sheppard, Nicholas, Surminen, Martin; Location Constraints in Digital Rights Management; Computer Communications, Elsevier Science Publishers, 31(6); pp. 1173-1180; 2008.
Written Opinion of the International Searching Authority; PCT/US2011/022876; 2012.
Subramanya, S.R., Yi, Byung; Utility Model for On-Demand Digital Content; Computer, IEEE Service Center, vol. 38, 6(1); pp. 95-98; 2005.
International Search Report and Written Opinion of the International Searching Authority; PCT/US2011/022902; Apr. 2011.
PR Newswire; Press Release; Mar. 12, 2011.
Spears, Joseph; GMANE Article, Beginner Questions on Clustering & M/R; Jul. 15, 2010.
Spears, Joseph; GMANE Article, Recommending Items for Anonymous Users; Apr. 19, 2010.
International Search Report and Written Opinion of the International Searching Authority; PCT/US2012/047520; Dec. 2012.
International Search Report and Written Opinion of the International Searching Authority; PCT/US2011/022877; Oct. 2011.

* cited by examiner

406
Inbound Communication Trigger

402b
Local SMTP Server saves MIME message

403b
MIME message and sender are decomposed

404
Decoded message and user reference are stored

405
Communications Software triggers message receipt event

400

401
Remote SMTP Server queues MIME encoded message

450b
Remote SMTP Server contacts local SMTP Server

451b
Remote SMTP Server transmits MIME message

452b

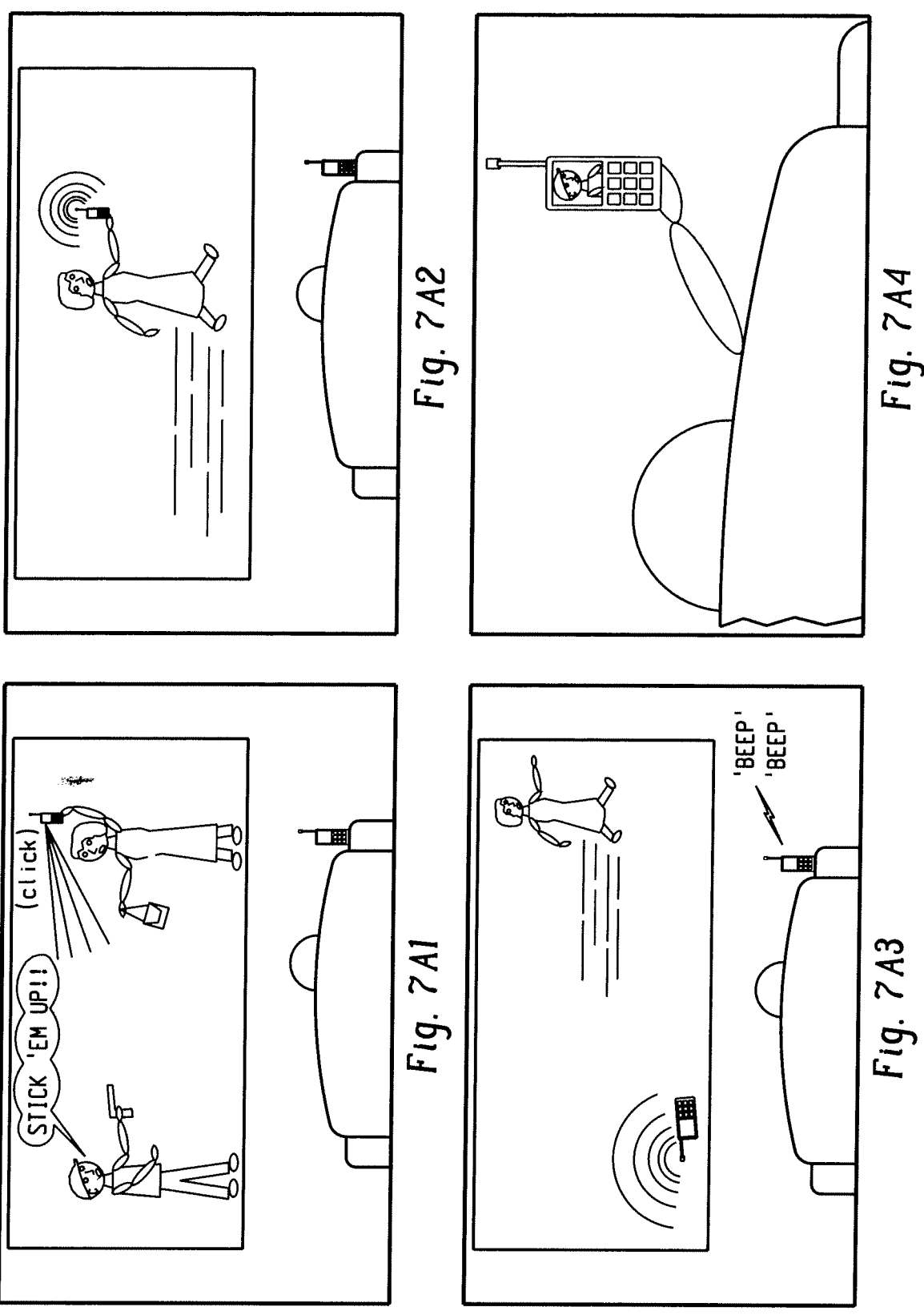
Fig. 7A2
Fig. 7A4
Fig. 7A1
Fig. 7A3

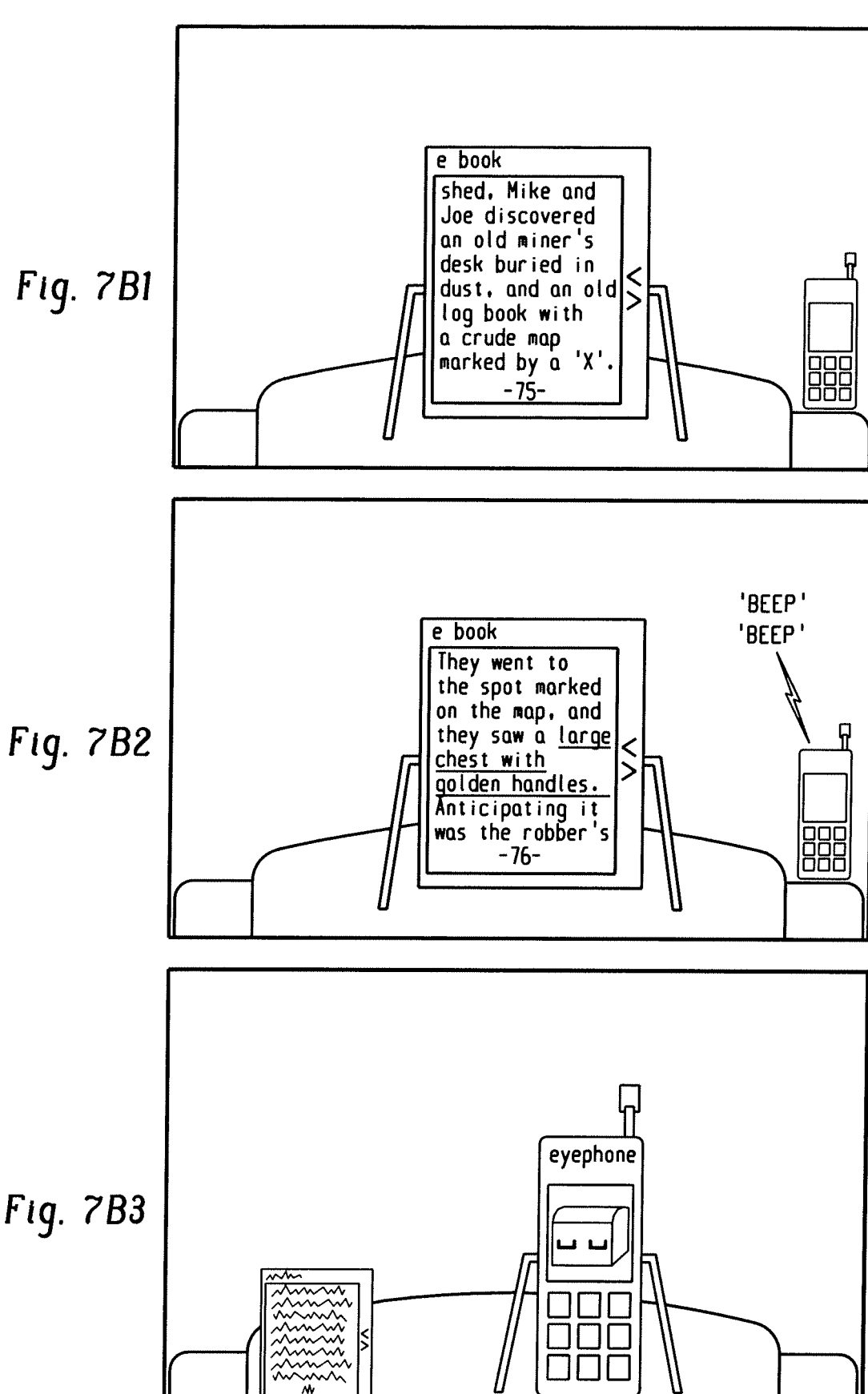
Fig. 7B1
Fig. 7B2
Fig. 7B3

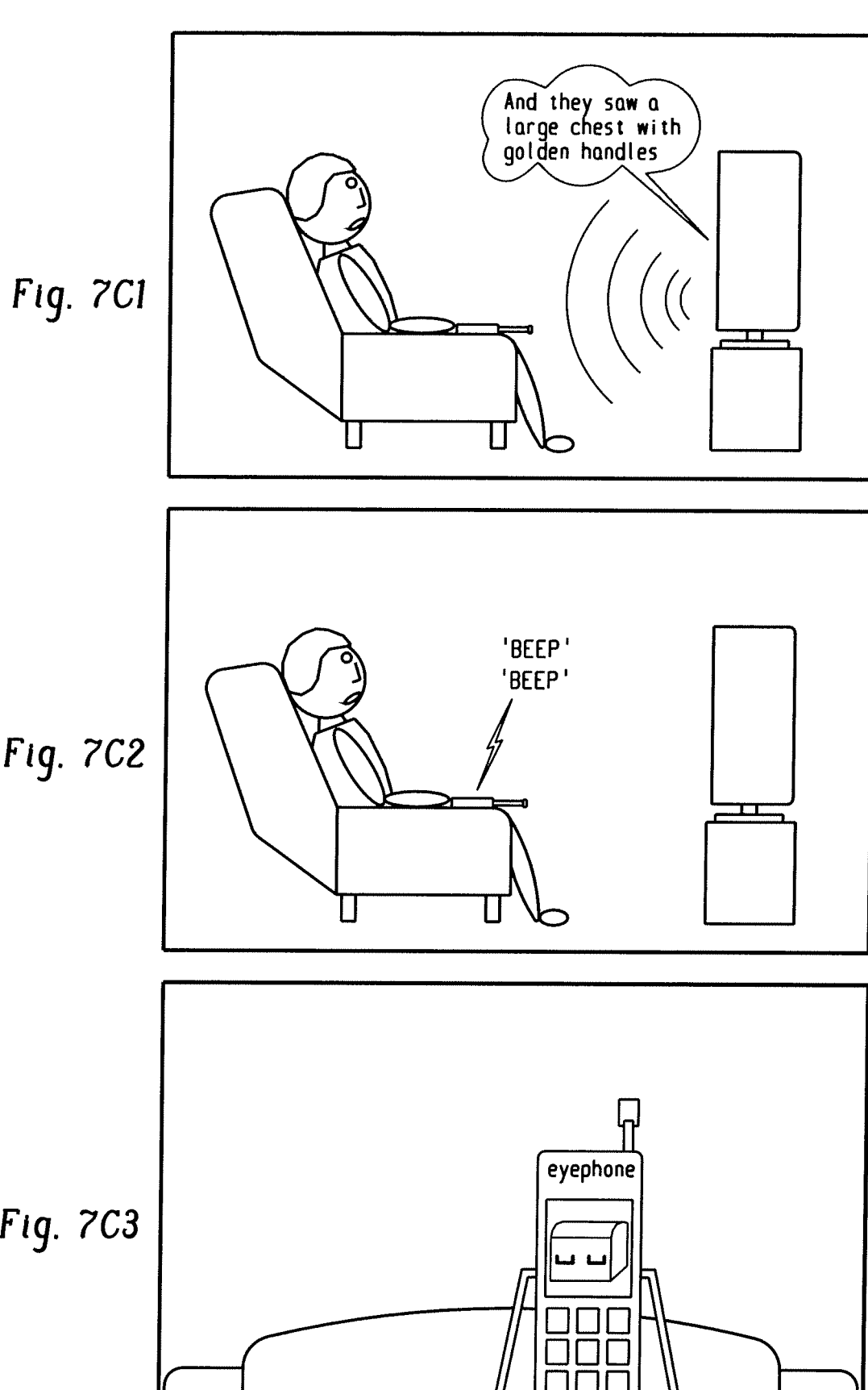
Fig. 7C1
Fig. 7C2
Fig. 7C3

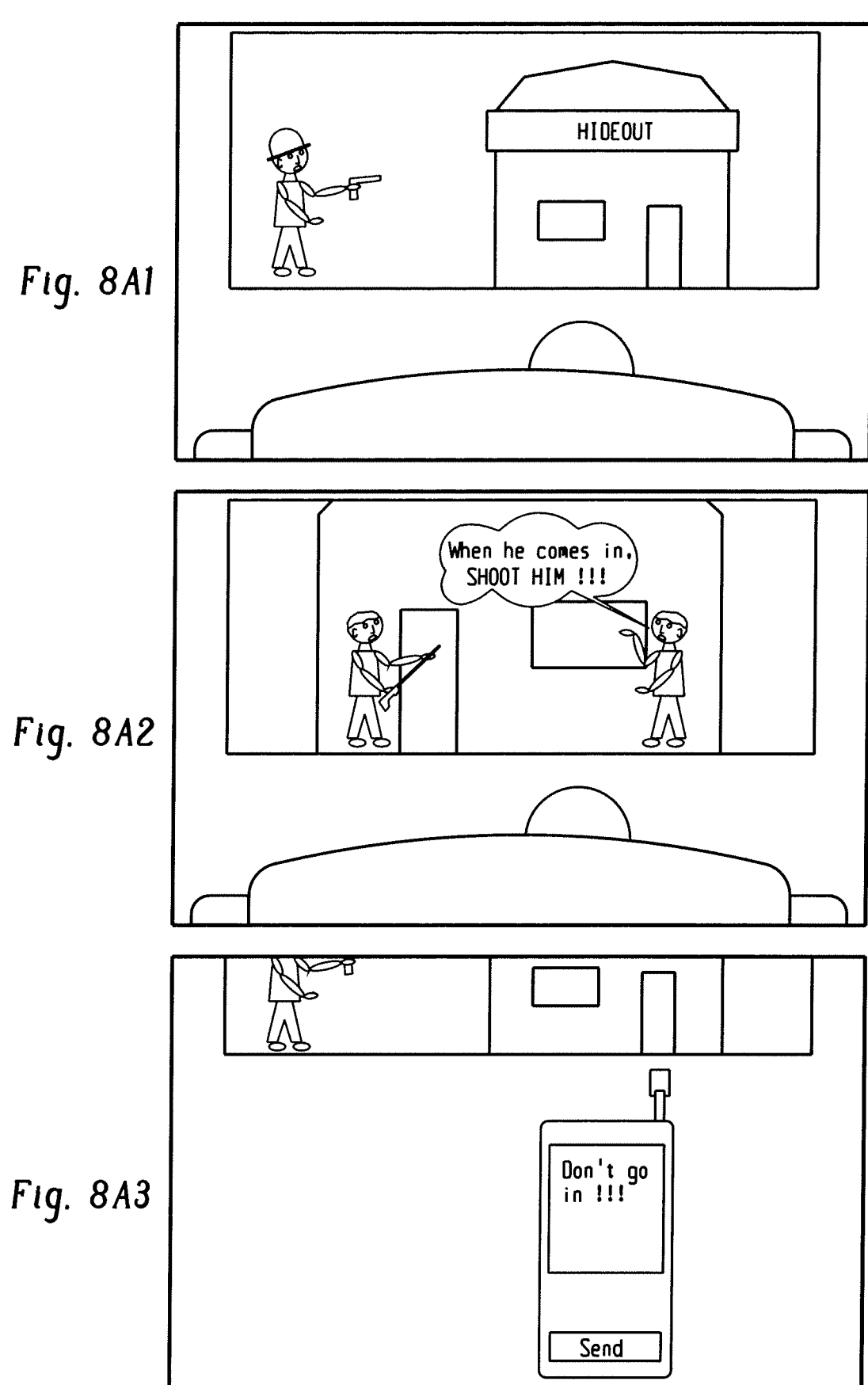
Fig. 8A1
Fig. 8A2
Fig. 8A3

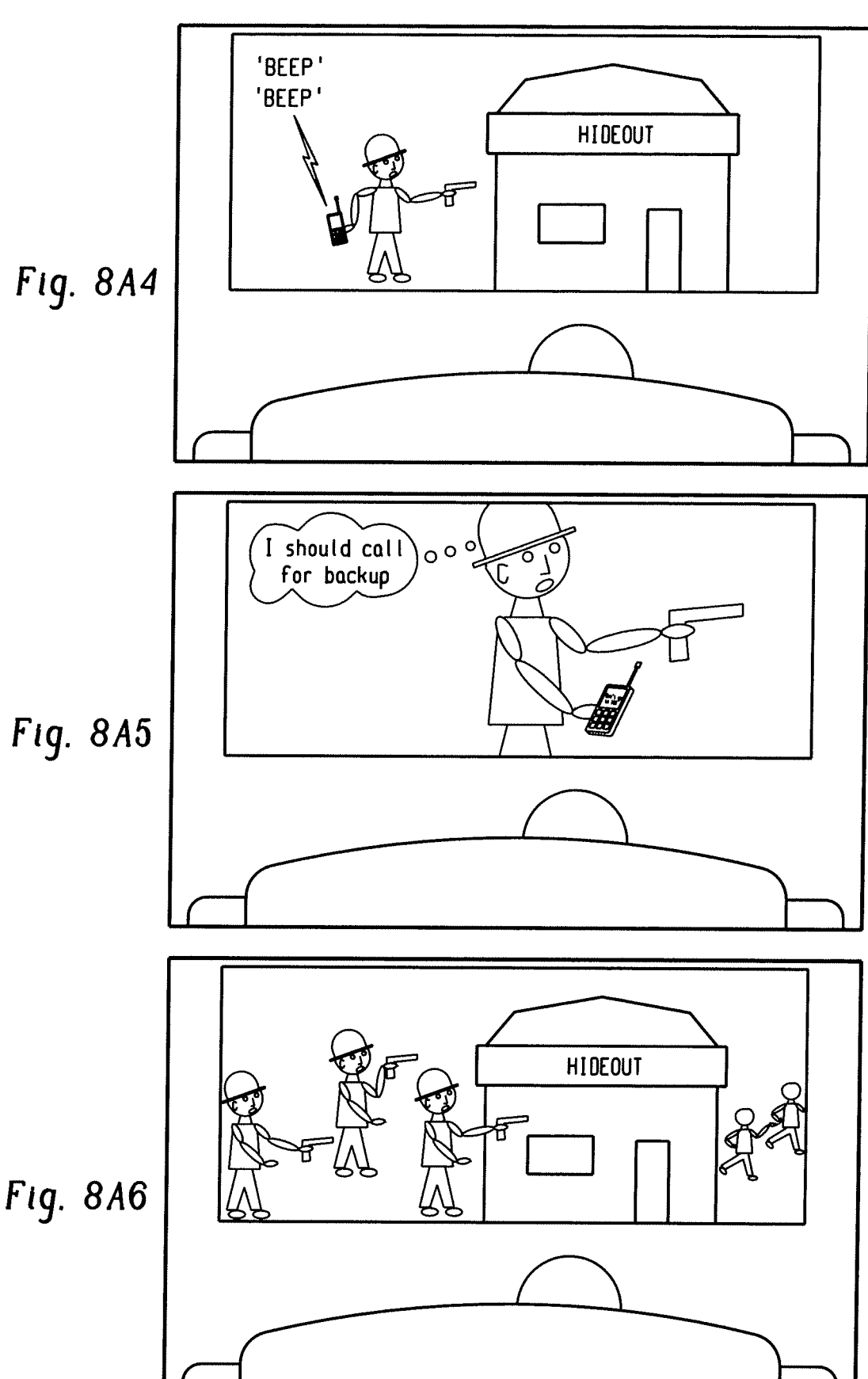
Fig. 8A4
Fig. 8A5
Fig. 8A6

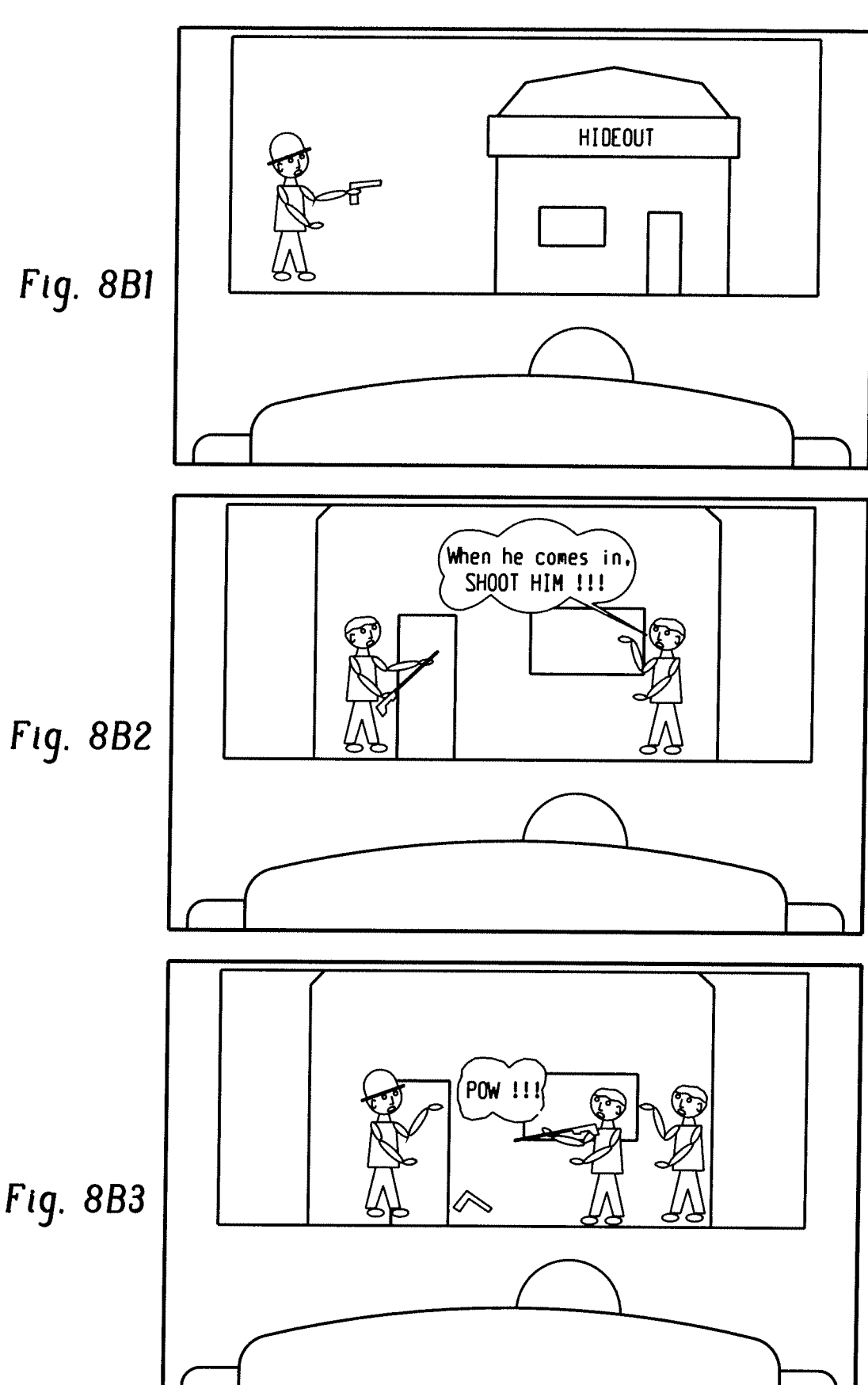
Fig. 8B1
Fig. 8B2
Fig. 8B3

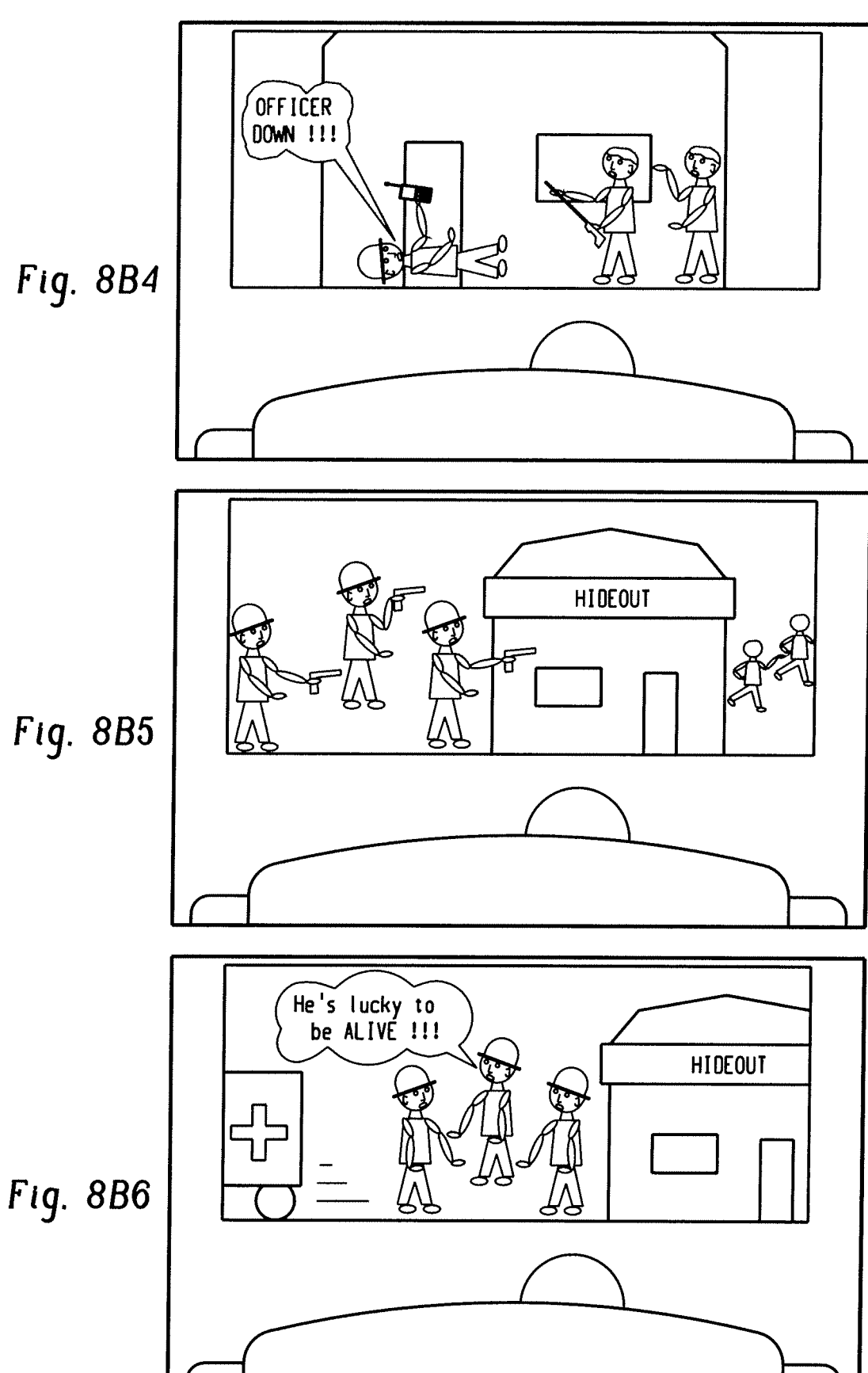
Fig. 8B4
Fig. 8B5
Fig. 8B6

METHOD AND SYSTEM FOR DELIVERY OF CONTENT OVER COMMUNICATION NETWORKS

CROSS REFERENCE TO RELATED APPLICATIONS

This application is a continuation of U.S. patent application Ser. No. 17/358,133, filed Jun. 25, 2021, entitled "Method and System for Delivery of Content Over An Electronic Book Channel," which is a continuation of U.S. patent application Ser. No. 16/407,809, filed May 9, 2019, entitled "Method and System for Delivery of Immersive Content Over Communication Networks," which is a continuation of U.S. patent application Ser. No. 15/814,484, filed Nov. 16, 2017, entitled "Method and System for Delivery of Content Over an Electronic Book Channel," which is a continuation of U.S. patent application Ser. No. 15/232,920, filed Aug. 10, 2016, entitled "Method and System for Delivery of Immersive Content Over Communication Networks," which is a continuation of U.S. patent application Ser. No. 12/868,249, filed Aug. 25, 2010, entitled "Method and System for Delivery of Immersive Content over Communication Networks," the entirety of which are herein incorporated by reference.

TECHNICAL FIELD

The present disclosure relates generally to content distribution and more specifically to computer-implemented systems and methods for enabling users to supplement dynamic content streams through interactions with point-to-point communication networks.

BACKGROUND

Traditional pre-recorded media content (e.g., film, TV, recorded music, e-books) is optimized as broadcast content (i.e., content formatted for mass delivery and disseminated to a broad audience, traditionally from a single sender to multiple recipients). As such, all users of broadcast content (e.g., viewers of a movie, listeners of a song, readers of a book, or other recipients or consumers of content) are seeing, hearing or otherwise experiencing the exact same content as other users of the content.

Two examples of this broadcast content are television and radio content. Television and radio content (e.g., TV shows, movies, recorded music) are fixed (i.e., unchanged) files or embodiments of the content that are traditionally delivered (i.e., broadcast) by electromagnetic transmissions (e.g., over radio waves, through satellite signals, via coaxial or optical cable) that represent the transmission of pre-recorded video or audio content where all users that have a television or radio will be able to receive, decode and consume the content. Because the same broadcast content may be delivered at different times to different large communities of users (e.g., a TV show that is shown at 8:00 PM EST in the Eastern Time Zone and at 8:00 PM PST in the Pacific Time Zone), the broadcast medium (i.e., the collective system of transmission relays that deliver the content from its source to the destination) does not strictly require that the show be seen at the same time by all users, but rather that when the content is seen or heard by users, the content is the same for all users.

A third example of broadcast content is pre-recorded content (again, a fixed file or embodiment of the content) that, instead of being delivered via radio waves, is delivered in the form of manufactured physical product. Pre-recorded content (e.g., a TV series, movie, e-book, music) is content that is encoded into a digital format, saved on a digital medium (e.g., DVD, CD, Blu-Ray disk, tape cassette) and copied via a mass-manufacturing process, with each such physical copy being distributed to users via a physical distribution process (e.g., sold in stores, online). Each user who purchases the physical copy may consume the content using their individual playback device. Again, because the content is generally consumed by these users at any time, the distinctive aspect of the broadcast content is that it is being produced in a way that all users see or hear the same content regardless of when it is viewed or listened to.

Recent technologies (e.g., Internet delivery, on-demand cable television, Digital Video Recorders) provide users with a fourth example of broadcast content—namely, the ability to "time shift" received content so that traditional broadcast content (i.e., a fixed file or embodiment of the content) can be delivered anytime the customer wants to consume it. This "time shifting" allows content users to change the time at which the content is delivered or consumed. However, the nature of the content reflects its broadcast roots (i.e., the content delivered to any particular user is identical to the content delivered to every other user).

Clearly, broadcast content need not be defined by its temporal aspect (i.e., it is not time-based because different users may receive the same broadcast content at different times), or its delivery medium (e.g., delivery over radio waves, delivery over physical cables, or delivery via physical manufacturing and distribution outlets such as being packaged onto a DVD or sold in a store). Rather, it is defined by the fact that all users receive the same content. More specifically, broadcast content has the following characteristics:

1. It is static. The content will always be the same no matter what context it is viewed in, who is watching the content, or in what way the content is affecting the user. The content will not change. For example, when a user reads a book multiple times, the same words always appear on the page.
2. It is efficient. Because the content is static, no alternate story lines, auxiliary content, or the like need be produced. The static quality of broadcast content translates into an efficiency in the ways in which the content can be produced and distributed. For example, the efficiency aspect of a film translates into the ability to package it for mass-market sale via DVD.
3. It is passive. The user is not required to perform any action in order to change the content (nor can the content accommodate any change based on the actions of a user). The user is solely a passive observer of the story or experience as it unfolds. It is a passive or "lean back" viewing or listening experience for the user.
4. There is a user expectation that the viewing or listening experience will be passive. By experiencing the content in this manner, users are able to derive all of the benefits that such content has to offer. For instance, viewers of broadcast television do not intend or expect to be able to influence the outcome of a television show while watching it.
5. It is unidirectional. All interactions with users happen in a single direction from the content broadcast point to the user. Although there have been experiments (such as call-in shows) where users en-masse can change the outcome of a show (e.g., voting a contestant off of a show by dialing a phone number), any change is universally propagated to all users regardless of their participation in the communication process. Therefore, since the content is not affected by an individual user's interactions, the content is still delivered unidirectionally.

6. It is distributed via a single channel at a time. This means that the way to consume the content is via a single mechanism, such as transmission via television broadcast or downloading of the primary content via the Internet. Although users may be able to download additional, supplemental content after consuming the primary content (e.g., by visiting a Web site after viewing the movie to get an extended interview or director's cut), these actions (e.g., consuming the primary content on one device and consuming supplemental content on another) are all controlled by the user rather than by a centralized distribution system, and as such, would be more appropriately described as the consumption of separate content. In other words, the content is not being broadcast via multiple channels, but rather is only being consumed by the user via multiple channels.

Of course, broadcast content is not the only form of content available to users. At the opposite end of the rich media content spectrum are video games. As video games continue to grow in sophistication, they have, in and of themselves, become an expressive, story-telling medium. A video game has the following characteristics:

1. It is dynamic. The outcome of the game is largely dependent on the actions of the user. If the user performs one series of actions, the game will likely take an entirely different form than if the user chose another set of actions.

2. It is inefficient. Because multiple outcomes are possible, each possible outcome is created even when these outcomes are completely exclusive of one other.

3. It is active. The user performs actions in order for the game to proceed. In some types of games, an inactive user will result in the game not advancing, and in other types of games, the game will end altogether if the user is inactive. In this sense, the user is an essential part of the story.

4. There is a user expectation that the viewing or listening experience will be active. Users engage in a video game primarily to accomplish a goal. This may be a social goal (e.g., to defeat a friend), a personal goal (e.g., to surpass a personal best or to accomplish a mission intrinsic to the game itself), or some other type of goal.

5. It is bidirectional. Users provide input to the game and the game provides input to the user. In some games, this is done with a game controller (a special piece of hardware that allows the user to press buttons that are mapped to actions in the game), while in other games, the input can be provided to the game through a camera, microphone, or other more natural device. In other words, the bidirectionality of the game enables the game to be active.

6. It can be distributed via multiple channels at a time. Especially with the advent of social games and the Massively Multiplayer Online Role Playing Game ("MMORPG") game genre, users can receive signals about game play when they are not actively playing a game. These signals can include a text message when the user is attacked or an email when the user's "tribe" starts a "campaign." Some games can use multiple channels in game play. One example of using multiple channels in a game may include forcing a user to solve a puzzle on a Web site to unlock a level in a non-Web-based game.

SUMMARY

In accordance with the teachings provided herein, systems and methods of providing content to a user via communications between a content provider and a user over a plurality of disparate communication channels are provided. Content is provided to a user via a first transmission channel for presentation, where metadata associated with the content identifies a content event trigger at a point in the content, and where the content is displayed using a first presentation system. When the content event trigger is reached, supplemental content is provided to the user via a second transmission channel, where the supplemental content is provided to the user during continued presentation of the content, and where the supplemental content is provided to the user using a content providing system that is wholly separate from the first presentation system.

Another example of a computer-implemented method of providing content to a user via communications between a content provider and a user over a plurality of disparate communication channels may include providing content to a user via a first transmission channel for presentation, wherein the content is displayed using a first presentation system. A communication may be received from the user using a receiving system that is wholly separate from the first display system. The content that is provided via the first transmission channel is transformed and displayed using the first display system, where the transformation is unique to the user and includes one of a plurality of predetermined paths, and where an incorporated path is selected based on the communication from the user.

BRIEF DESCRIPTION OF THE DRAWINGS

FIGS. 7A1-4 depicts an example user viewing experience where the user receives outbound supplemental MMS content based on detection of a content event trigger.

FIGS. 7B1-3 depicts an example user experience while reading an electronic book (e-book) where the user receives outbound supplemental MMS content based on detection of a content event trigger.

FIGS. 7C1-3 depicts an example user experience while listening to an audio content stream where the user receives outbound supplemental MMS content based on detection of a content event trigger.

FIGS. 8A1-6 depicts an example user viewing experience where the content stream is transformed based on an inbound communication trigger from a user generated SMS message.

FIGS. 8B1-6 depicts an example user viewing experience where the inbound communication trigger described in FIG. 8A is never generated and so the content stream remains untransformed.

DETAILED DESCRIPTION

Figure 1A:
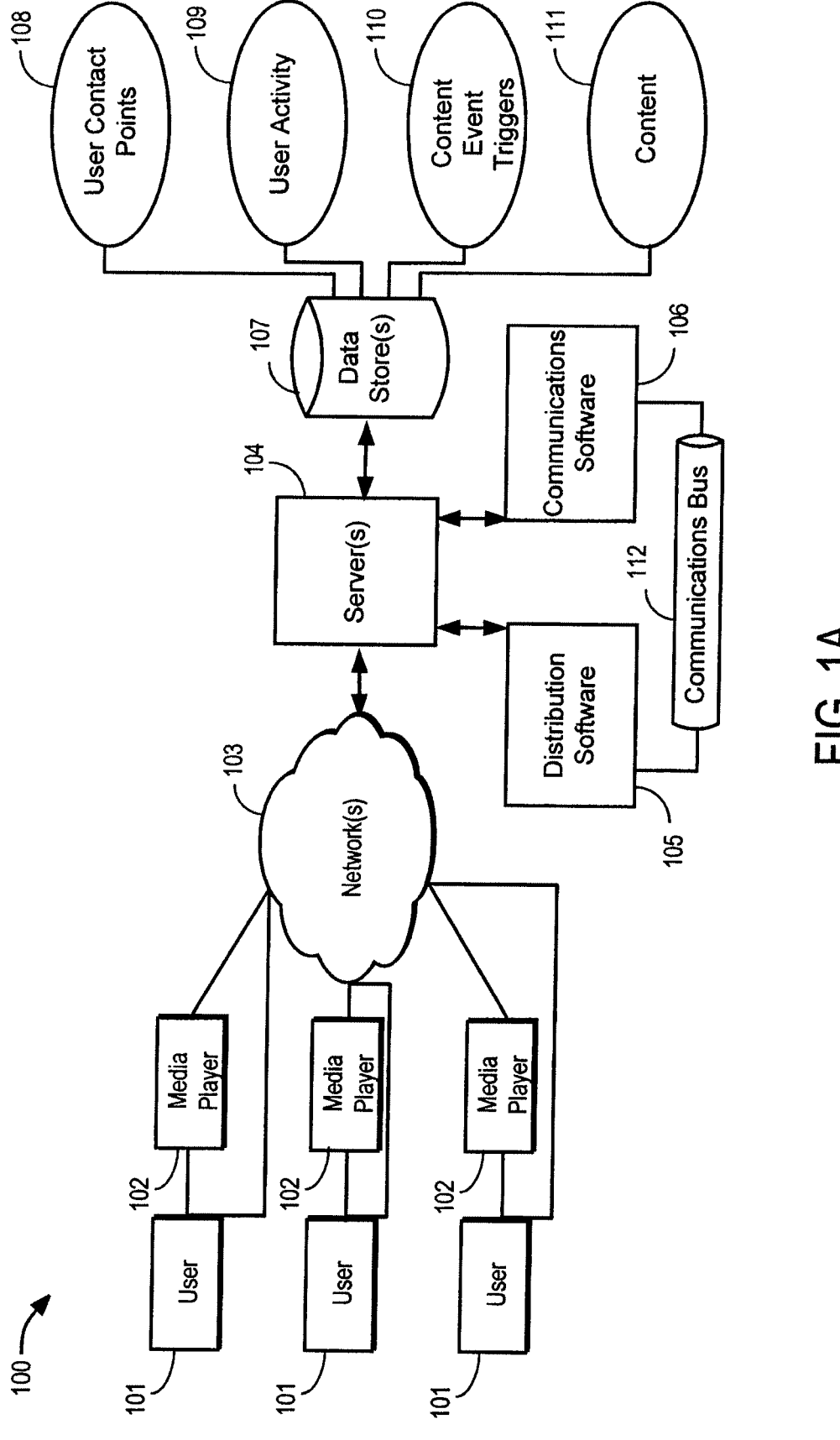
FIG. 1A is a block diagram of an example computer-implemented environment for allowing a user to interact with a point-to-point, communications enabled content distribution system that utilizes a hybrid model of content creation/distribution.

FIG. 1A is a block diagram of an example computer-implemented environment for allowing a user to interact with a point-to-point, communications enabled content distribution system that utilizes a hybrid model of content creation/distribution. Because of the ability to enhance a story, the ability to interact with users using a hybrid model (i.e., sharing characteristics with both broadcast content and video games) is useful to a content creator. Using the systems and methods described within this disclosure, multiple types of hybrid models can be constructed.

In some implementations, a hybrid model could be built that shares characteristics with the broadcast content model except that it is distributed over multiple channels. In addition to the primary content distribution channel (e.g., Internet TV delivery), supplemental content is delivered over a cellular network to a rich-media capable handset. This supplemental content could be a message that simulates as originating from one of the characters in the story and which is delivered to the user. Through the use of multiple channels, the story telling experience is enriched and allows the user to enjoy the content in a much more real and personal way.

In some implementations, a hybrid model could be built that is completely different than the broadcast content model and which has the following characteristics:

1. It is static with dynamic elements. Like broadcast content, there is a single story thread that weaves throughout the entire experience. Unlike broadcast content, parts of the story can be modified during its consumption so that it could be different on each replay. For instance, based on user interactions, a criminal, although ultimately destined to be caught by the detective, may be caught in a different place or with different evidence.

2. It can be either efficient or inefficient. If the content contains mutually exclusive elements, such as alternate story lines, then the content is inefficient. If the content contains supplemental content that can enrich the core content, then the content is efficient.

3. It is passive with active elements. The content can be passively experienced. However, for any of the dynamic elements to be activated, the user would need to initiate the action.

4. It creates a user expectation that includes both passive and active elements. Like broadcast content, the purpose of this hybrid model is to provide an experience (e.g., a story) for the user. There may be parts of the experience in which the user forms a strong preference and when situations arise that are counter to the user's preference. The user may be driven to influence those particular situations. For example, the user may, over the course of a story, develop an affinity for a character in the story. In a broadcast context, the user may yell, to no avail, "Don't go in there, the bad guys are waiting for you!" at the television screen. In a hybrid model, the user could cause the character to avoid the dangerous situation while otherwise remaining as an experience driven medium.

5. It is unidirectional with bidirectional elements. Until the user decides to provide feedback to the distribution system, content is unidirectional.

6. It is distributed via a single channel.

This second hybrid model is much more like a video game. However, unlike a video game, this hybrid model does not require the user to be active. In the event that the user is a passive viewer of the content, the story could continue to unfold in a passive way. However, the richest experience would be available to users that engage the active elements of the content. Based on user actions, the story could progress along one of a number of predetermined paths, or alternate story lines, such that users performing different actions could be provided differing experiences.

Many other hybrid models can be built by combining broadcast and video game elements together. This is possible using modern point-to-point delivery mechanisms specifically optimized for digital content (e.g., Internet, cable, satellite and mobile phone networks). Communications infrastructure (e.g., telephone, SMS, email, and MMS) can be used as a set of ubiquitous, natural controls which, when combined with the point-to-point delivery networks, can be used to create a richer experience that encompasses active, bidirectional content elements.

System 100 can be a computer-implemented environment wherein one or more users 101 can interact with distribution software 105 and communications software 106 hosted on one or more servers 104 through one or more networks 103. The distribution software 105 contains software operations or routines for solving a content distribution problem. The communications software 106 contains software operations or routines for solving a communications problem. The users 101 can interact with the distribution software through the use of a media player 102. The media player 102 contains software operations or routines for decoding content delivered to the media player 102 from the distribution software 105. The users can interact with the distribution software 105 and communications software 106 in a number of ways, such as over one or more networks 103. The media player can interact with the distribution software 105 in a number of ways, such as over one or more networks 103. One or more servers 104 accessible through the network(s) 103 can host the distribution software 105 and communications software 106. It should also be understood that the distribution software 105, communication software 106, and media player 102 could also be provided on a stand-alone computer for access by a user. One or more data stores 107 can store raw or derived content and user and user-related data (e.g., data and metadata) for use in determining actions to be taken (e.g., based on particular analysis, constraints, events or triggers). Examples of data store(s) 107 can include relational database management systems (RDBMS) and a multi-dimensional database (MDDB), such as an Online Analytical Processing (OLAP) database, etc.

Data stored in the data store(s) 107 includes user contact points 108 for users 101. These user contact points contain encoded information that the system can use to send data to a user through the communications software 106. Examples of user contact points 108 would include email addresses, telephone numbers, instant messenger accounts and networks, social network profile data, and mobile phone numbers. Data stored in the data store(s) 107 includes user activity 109 that can contain interactions of users 101 of the distribution software 105. User activity data 109 can include a map of users who are currently consuming content and positional information related to the consumed content (such as cut points, cues or time indexes) so that the distribution software 105 can determine the user's context within the content stream. Data stored in the data store(s) 107 includes content event triggers 110. These content event triggers 110 relate to contextual information and goal-state positional information that the distribution software 105 can use to determine when a series of actions should occur. Content event triggers are data, metadata, or software that is used by the system to determine when certain processes should occur in relation to content. In some implementations, the content event trigger 110 can be a time index of a particular piece of content that, when processed, would cause a communications signal to be sent. In other implementations, the event trigger 110 can be a cue that is used to determine that the distribution software 105 should query the communications software 106 for an inbound message from a user, and the result of the query could dictate a number of potential actions that the distribution software 105 would dynamically perform.

Data stored in the data store(s) 107 includes content 111. In some implementations, this content can be a combination of primary and supplemental content that can be played serially through a unidirectional content stream. In other implementations, this content can be primary and supplemental content that is delivered in parallel over a single or through multiple point-to-point channels. Examples include the transmission of a content stream to the media player 102 that shows a fictional attack of a character from the narrative view while simultaneously transmitting supplemental content through a mobile network via MMS (Multimedia Message Service) showing a picture of a fictional attacker from the view of the fictional victim's camera phone. In other implementations, the content 111 can include bidirectional data consisting of data generated by the original content creator as well as content created by the user as part of an active content experience. In this implementation, the content from the original content creator and user generated content can be combined in the content stream to create a new piece of content dynamically.

The distributions software 105 and communications software 106 communicate by passing signals and data through one or more communications bus(es) 112. Communication can occur synchronously or asynchronously and can be unidirectional or bidirectional. Examples of communications bus 112 can include message queuing systems (MQ), remote message interfaces (RMI) object request brokers (ORB), pipe-and-fifo systems, a Java messaging system (JMS), etc.

Figure 1B:
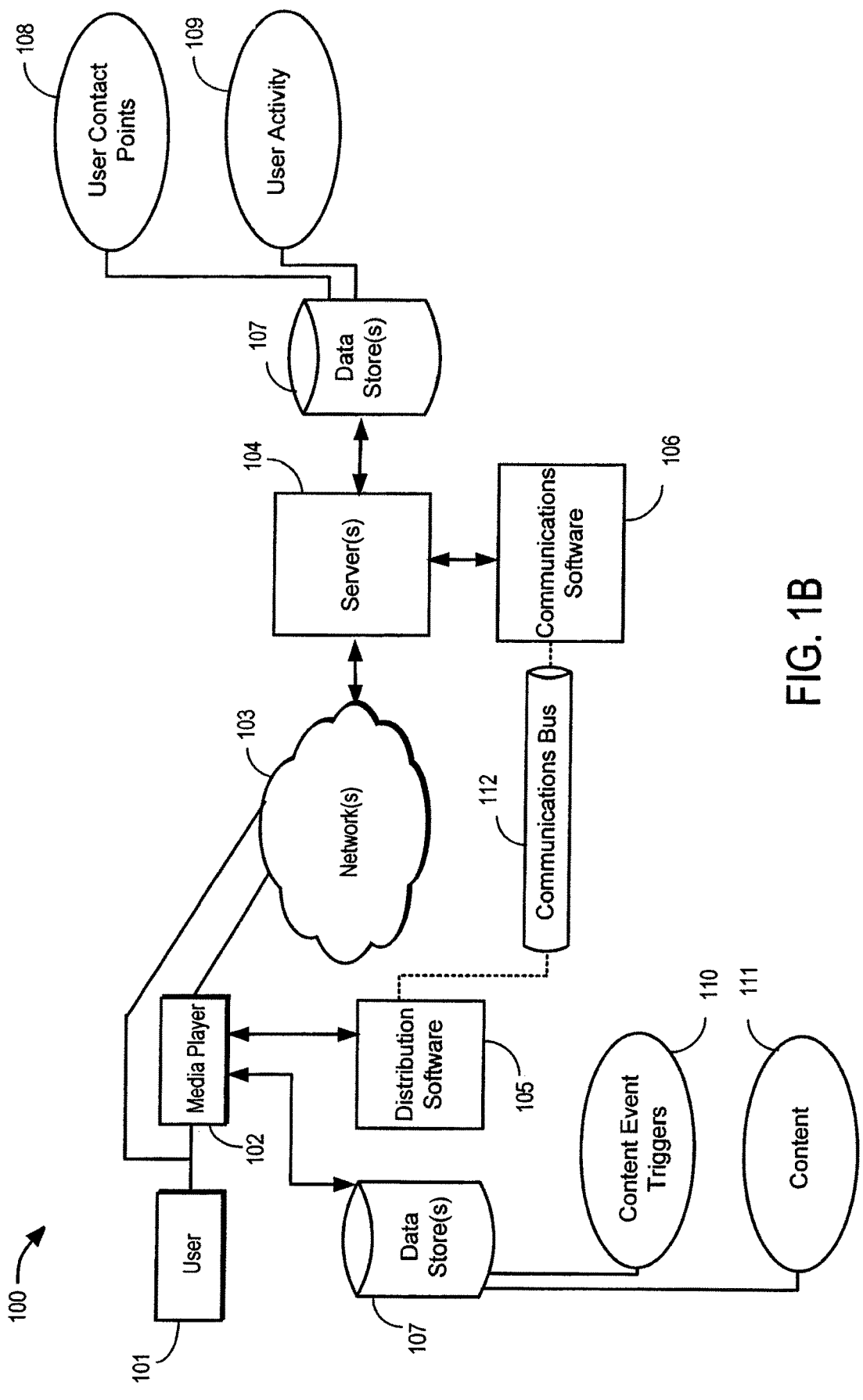
FIG. 1B is a block diagram of another example computer-implemented environment for allowing a user to interact with a point-to-point, communications enabled content distribution system.

FIG. 1B is a block diagram of another example computer-implemented environment for allowing a user to interact with a point-to-point, communications enabled content distribution system. FIG. 1B represents an example implementation where the content and content event triggers would be stored on and delivered from the media player 102 through the distribution software 105, which runs on the media player 102. In this example, the distribution software 105 communicates with the communications software 106 through a communications bus 112 that spans one or more networks 103. Components defined in FIG. 1B and having identical names and identifiers perform identical functions as those defined in FIG. 1A. Implementations using this topology include a set-top box (e.g., DVR, game console, cable box), Web-enabled TV or computer program that have a decodes a local copy of content and content event triggers but that use a centrally managed service in order to provide a communications framework to the user.

Figure 1C:
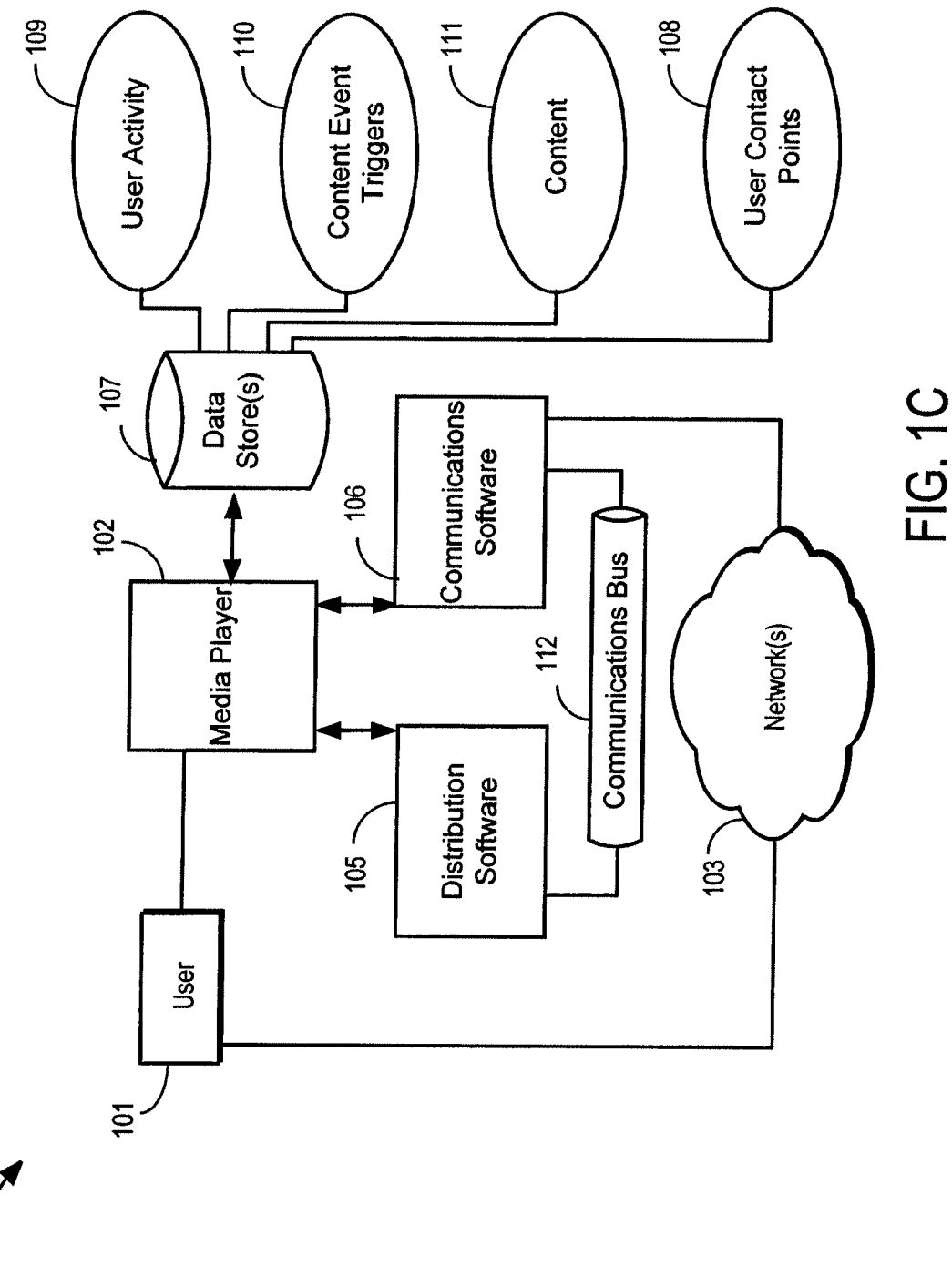
FIG. 1C is a block diagram of another example computer-implemented environment for allowing a user to interact with a point-to-point, communications enabled content distribution system.

FIG. 1C is a block diagram of another example computer-implemented environment for allowing a user to interact with a point-to-point, communications enabled content distribution system. FIG. 1C represents an example implementation where all system functionality is performed within the media player 102. Components defined in FIG. 1C and having identical names and identifiers perform identical functions as those defined in FIG. 1A. Implementations using this topology include a set-top box (e.g., DVR, game console, cable box), Web-enabled TV or computer program that performs all core functions locally and which can connect to a communications network independently in order to provide a communications framework to the user.

Figure 1D:
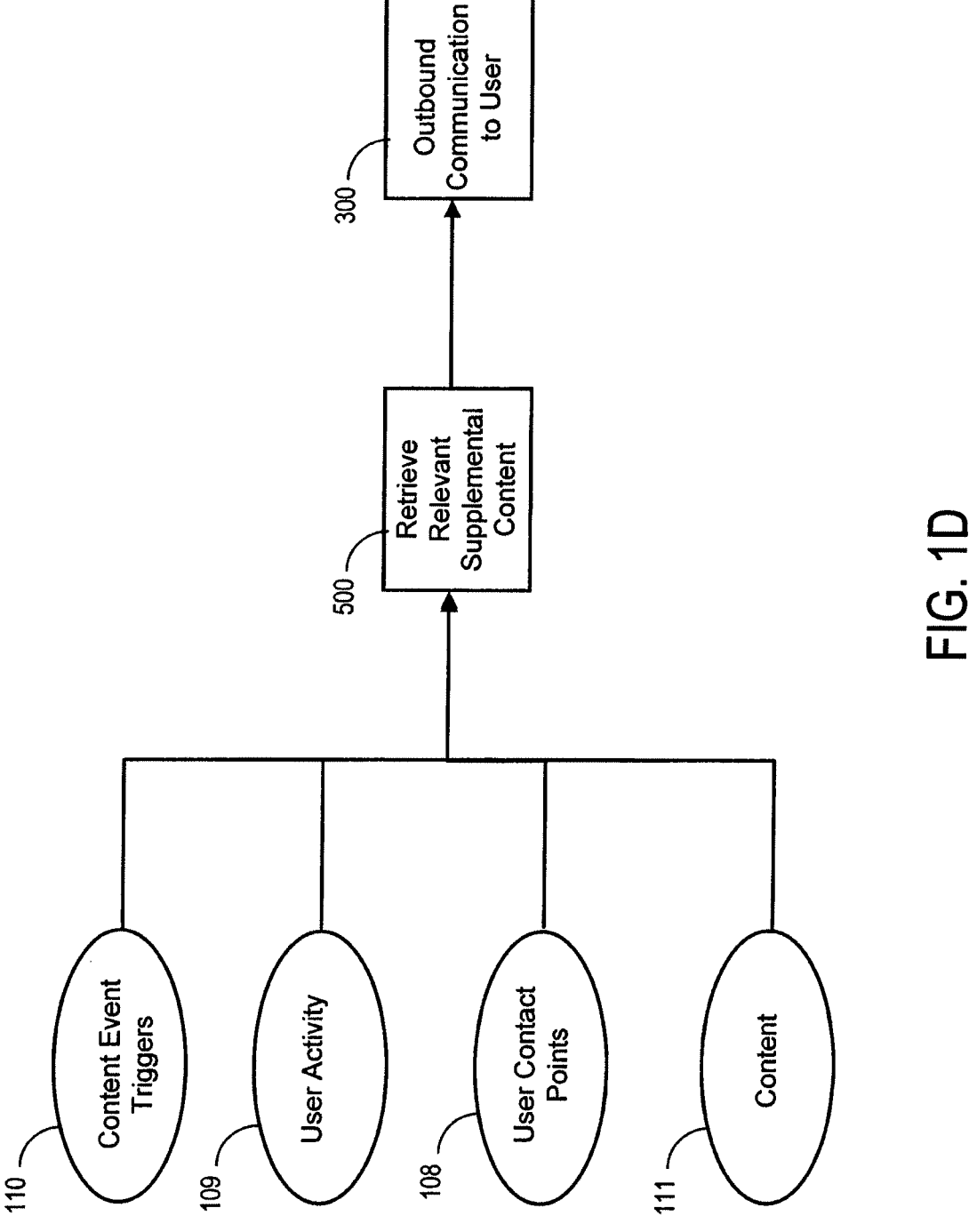
FIG. 1D is a block diagram depicting the high level process of determining and delivering supplemental content to a user.

FIG. 1D is a block diagram depicting the high level process of determining and delivering supplemental content to a user. This mechanism allows the content to be experienced over multiple channels. The mechanisms for this process are discussed in greater details in FIG. 3 and FIG. 5. However, based upon a content event trigger 110, user activity 109, and content 111, the system can retrieve relevant supplemental content 500 to be delivered to a user. Once the supplemental content has been identified, the user contact point 108 can be combined with the derived supplemental content and delivered as an outbound communication to the user 300.

Figure 1E:
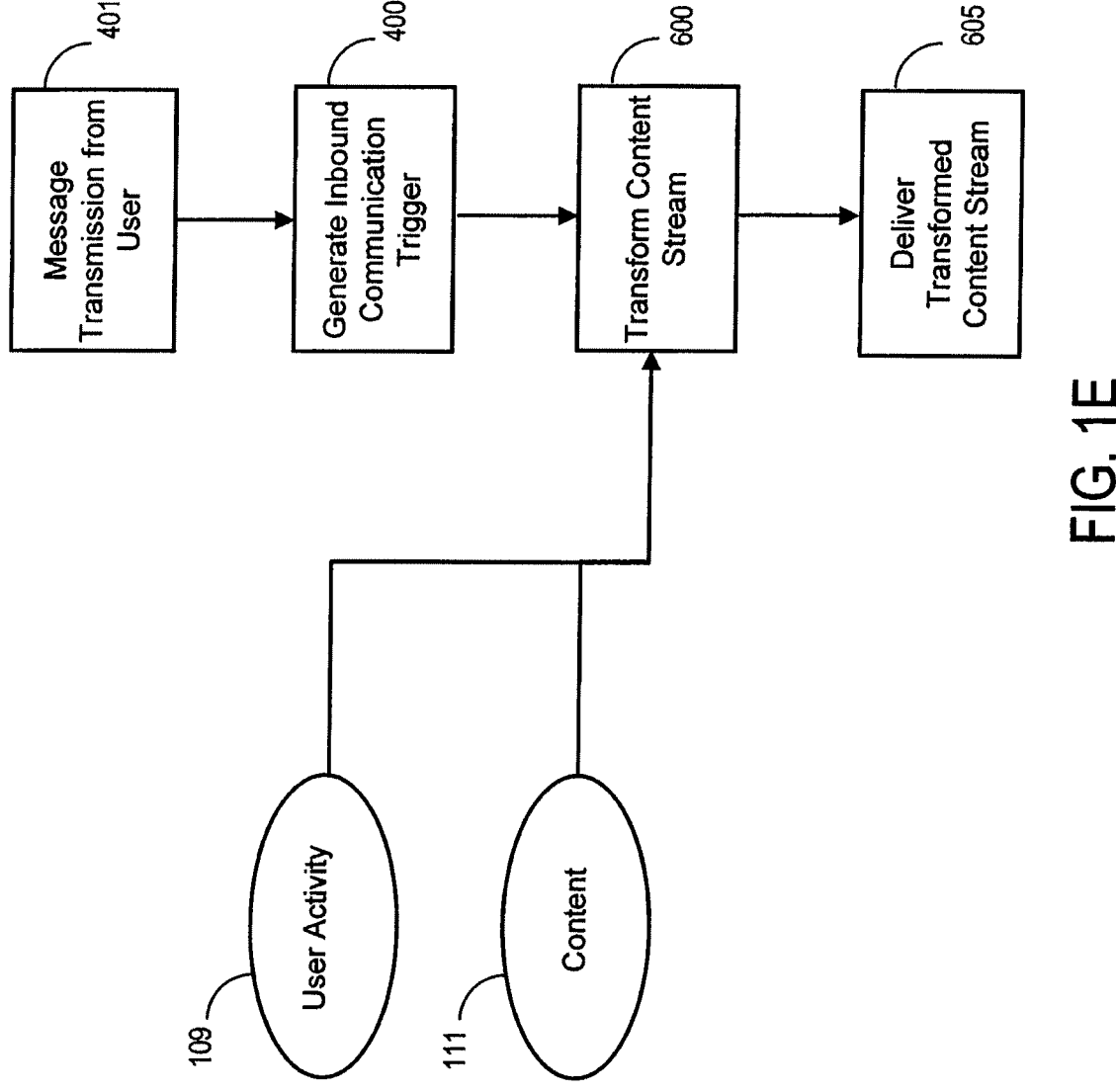
FIG. 1E is a block diagram depicting the high level process of transforming a content stream based on inbound communication events from a user.

FIG. 1E is a block diagram depicting the high level process of transforming a content stream based on inbound communication events from a user. The transformed content stream replaces or supplements the stream that is currently being delivered to a user. This process enables the content to be experienced bidirectionally. This is accomplished by receipt of a message transmission from a user 401, which then generates an inbound communication trigger 400. Steps 401 and 400 are described in greater detail in FIG. 4. Once the inbound communication trigger has been generated, the content stream is transformed 600 based on the data contained in the inbound communications trigger, other user activity 109, and content 111. Once the content stream is transformed, the transformed content stream is delivered to the user 605.

Figure 2:
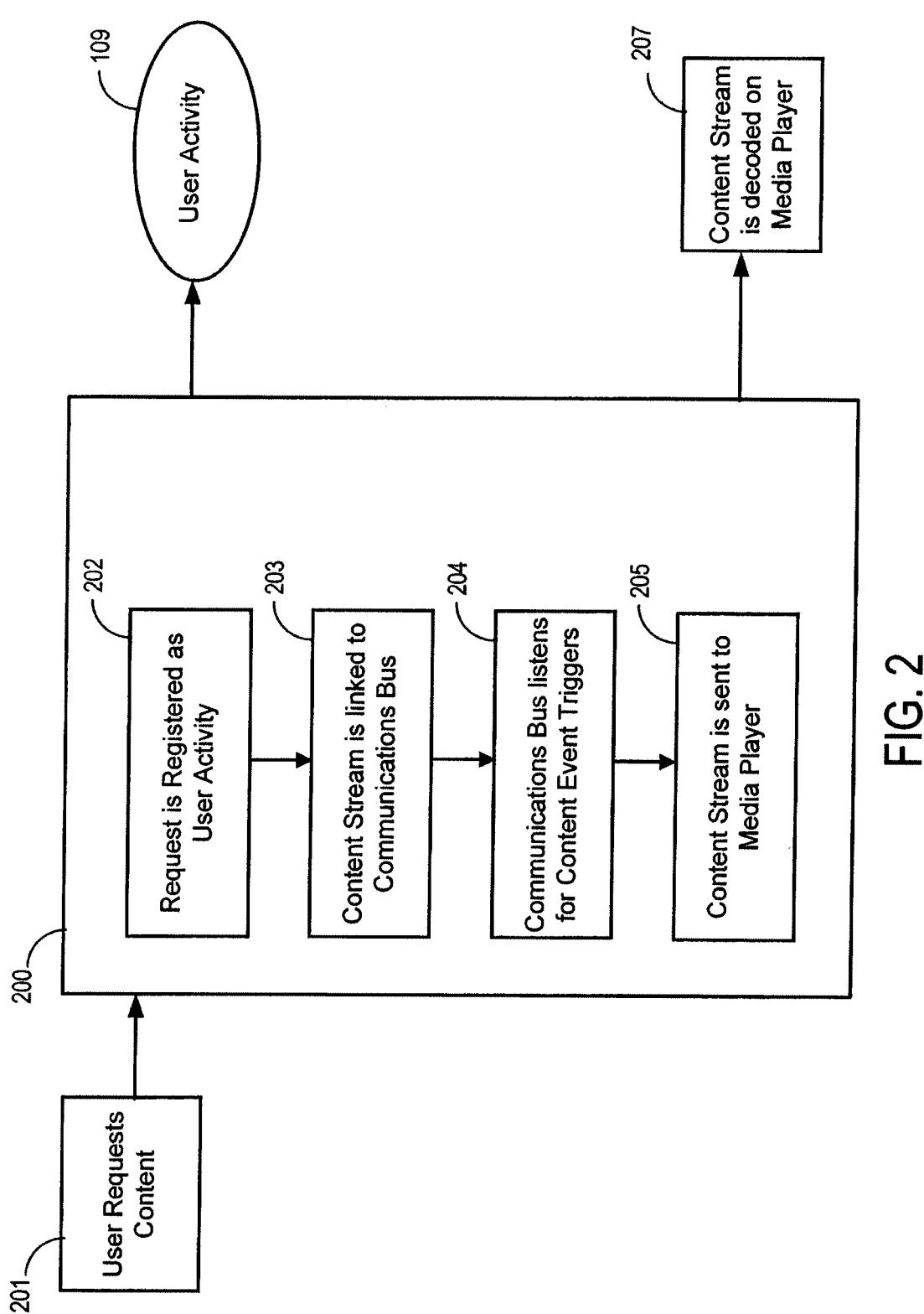
FIG. 2 is a block diagram depicting the distribution of content to users.

FIG. 2 is a block diagram depicting the distribution of content to users. The user request for a specific content item 201 is an input to subsystem 200 which has the responsibility of streaming the content to the media player 207. The media player can then decode the content stream 206 so that it is in a format suitable for end-user consumption. The subsystem 200 does this by registering the user request 202 which is stored in user activity 109. Once the user content request has been registered, a content stream is created. The content stream is a representation of content that can be transmitted over the communications medium (channel) and may then be decoded by the media player. This content stream is then linked to the communications bus 203. In some implementations, the communications bus is used for outbound message delivery on an alternate channel. In other implementations, the communications bus can be used to detect inbound messages which have the potential to trigger a modification to the content stream.

Once the connection to the communications bus has been completed, the link to the communications bus will listen for content event triggers 204. Once the communications bus has successfully entered a listening mode, the content stream may be sent to the media player 205.

Figure 3:
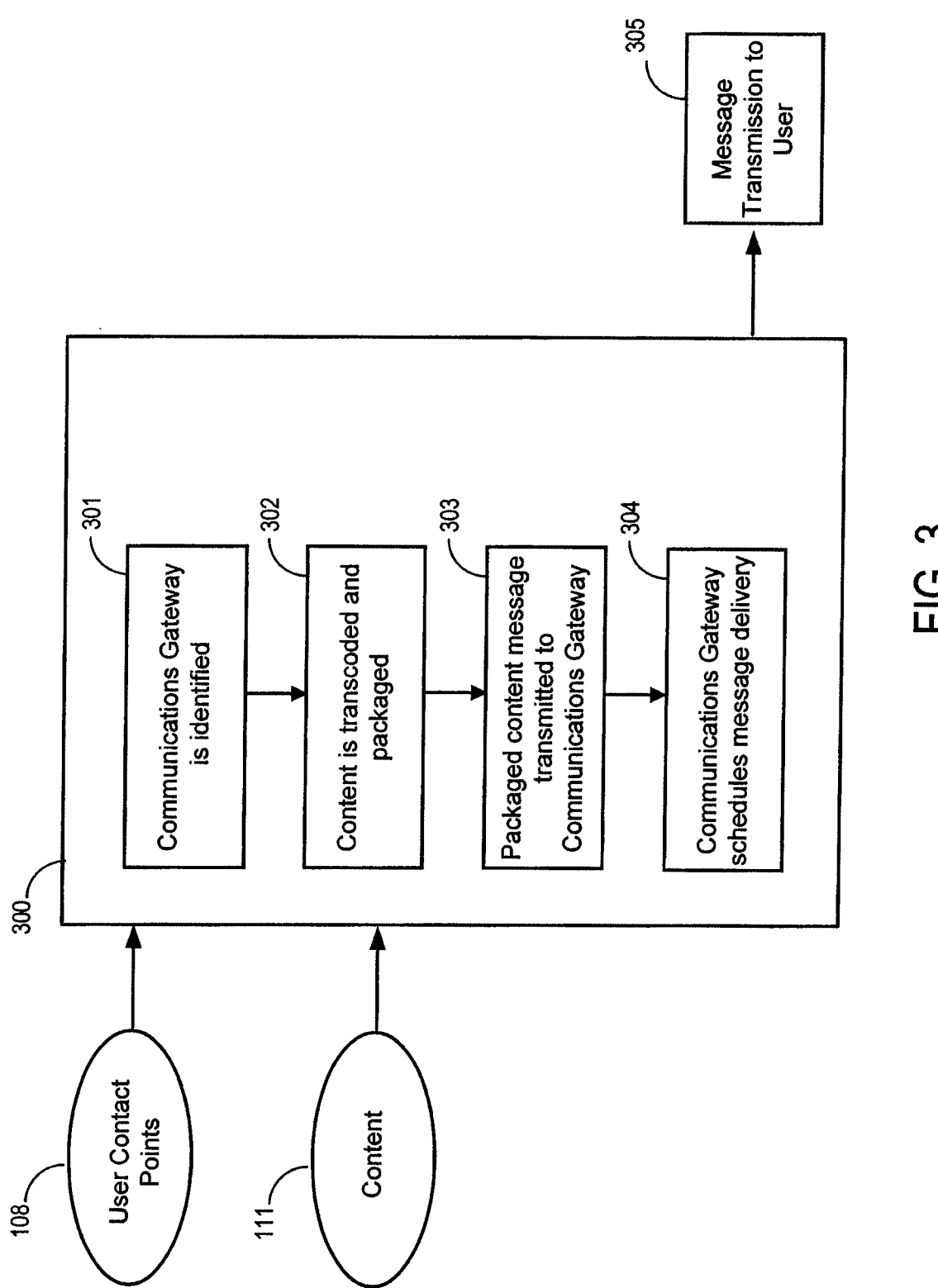
FIG. 3 is a block diagram depicting the process of delivering supplemental content to users via an alternate channel.

FIG. 3 is a block diagram depicting the process of delivering supplemental content to users via an alternate communication channel. This supplemental content may be delivered via any communications medium but FIGS. 3A-3D are block diagrams depicting example processes for delivering supplemental content via Voice Telephone, email, Short Message Service (SMS or colloquially referred to as mobile text messaging) and Multimedia Message Service (MMS or colloquially referred to as mobile picture messaging). Implementations could further be described through Instant Messaging gateways, Social Networking, Video Conferencing or other communications medium. Each additional implementation of other communications medium can follow the method illustrated by FIG. 3.

User contact points 108 and content 111 are provided as an input to subsystem 300 which has the responsibility of message transmission to a user 305. The subsystem 300 does this by retrieving a user contact point from the user contact points 108 and using this to identify the appropriate communications gateway 301 for the user contact point. Once the communications gateway has been identified, the content is transcoded (converted into a format compatible with the gateway) and packaged (prepared for transmission) 302. The packaged content message may then be transmitted to the communications gateway 303 using whatever protocol is defined for communicating with the particular gateway. When the communications gateway receives the message, the communications gateway will schedule message delivery 304.

Figure 3A:
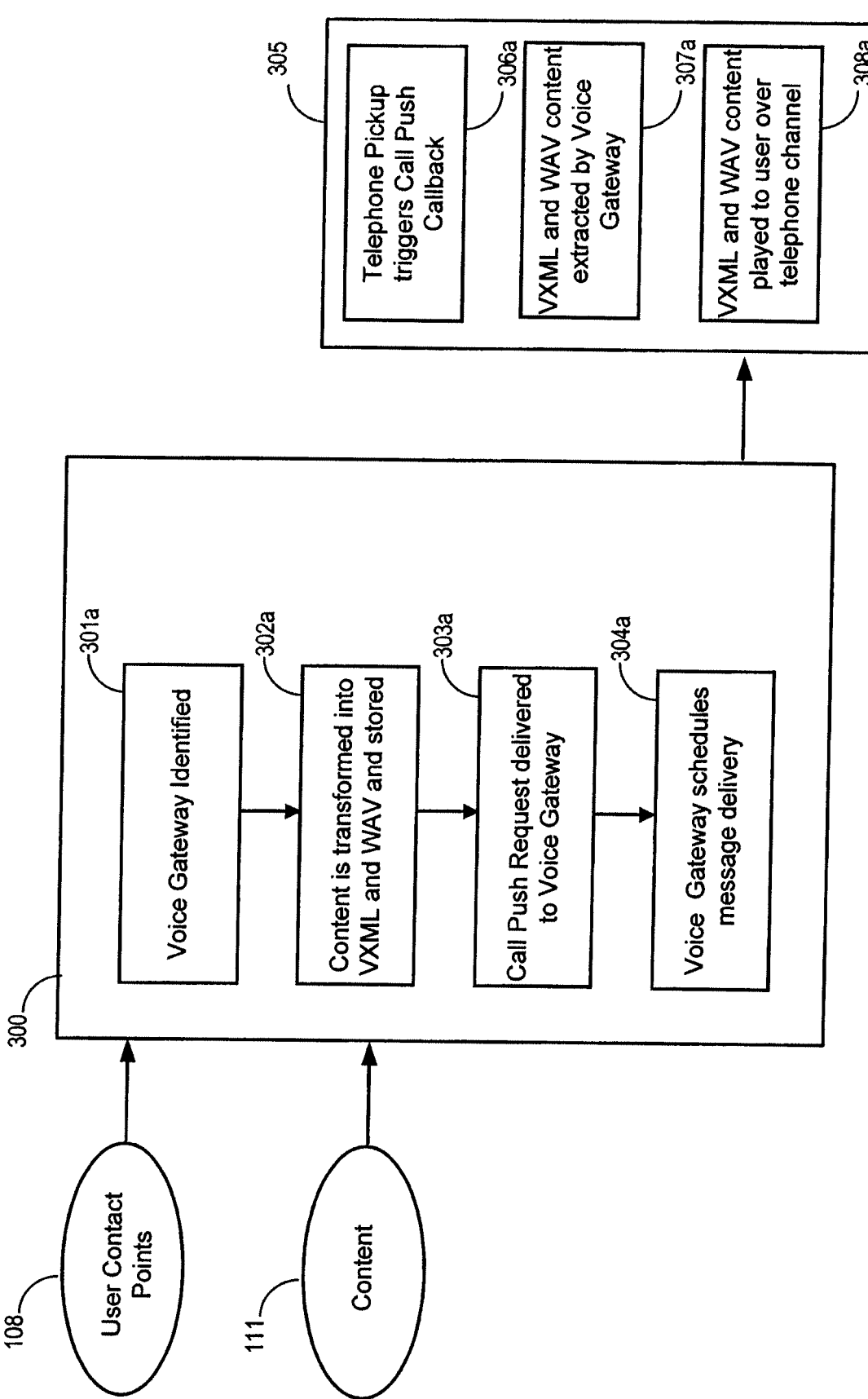
FIGS. 3A-3D are block diagrams depicting example processes for delivering supplemental content via Voice Telephone, email, Short Message Service (SMS or mobile text messaging) and Multimedia Message Service (MMS or colloquially referred to as mobile picture messaging).

FIG. 3A is a block diagram depicting the process of delivering supplemental content to users via a telephone voice gateway. FIG. 3A represents a specific example implementation that could be implemented to conform with some current commercial services that provide a voice gateway capabilities. Capabilities and features of such currently available commercial services include the definition of an interface layer that takes as input VXML and WAV formatted files and content streams and Internet communication protocol interfaces. Although this example assumes these features, other voice gateway service providers may exist that may require a different protocol, and in those cases, the mechanism illustrated in FIG. 3 would need to be adapted to meet the specific requirements of these other voice gateway service providers.

In this example implementation, the subsystem 300 would retrieve a voice telephone user contact point (e.g., telephone number) from the user contact points 108. Using the voice telephone user contact point, the subsystem would ensure that a voice gateway is identified 301a. In some implementations, there may be a single voice gateway, while in other implementations, the voice gateway can be selected from a plurality of voice gateways based upon factors such as proximity to user, service quality, service features, and cost.

Once the voice gateway has been identified, the content is transformed into Voice XML (VXML) and WAV audio formats and stored on the system 302a for later retrieval by the voice gateway service. VXML is a standard Text to Speech (TTS) scripting format that allows a computer to interact with a user via both dynamic and static content and then to collect input from a user based on either voice responses from the user or particular phone system keypresses. WAV audio formats are a particular file standard that is widely adopted. This format is a digital form of sound that has been captured and stored and can be replayed on any device or system that recognizes the format of this file. Transformation of content 111 on the system can be accomplished in a number of different ways. The content provider could provide VXML and WAV content that is specifically suited for transmission over a voice channel, or the content provider could provide different file formats that would need to be transformed into this content via alternate means. In some implementations, the content will be text which is then placed into a template VXML document. In some implementations, only a WAV file is present and the VXML will be dynamically generated in a way that allows the WAV file to be played immediately upon the user answering the phone. In other implementations, a WAV file will be extracted from another file type, such as a video stream, so that only the sound element of the video stream is delivered to the end-user. In other implementations, natural language processing and speech recognition can be employed to allow the text of the content to be extracted and inserted into a VXML document for dynamic TTS once the VXML engine begins playback to a user. In other implementations, a specially formatted text document can be transformed into VXML using a transformation algorithm (such as using XSLT to transform XML documents into VXML).

In the example implementation of FIG. 3A, the Voice Gateway requires an action called a "Call Push Request," which is a specially formatted message instructing the voice gateway to attempt to call a particular user. Part of the Call Push Request may include the location of the VXML to be used to playback to the user once they have answered their phone. In other implementations, the VXML or WAV content may be bundled as part of the Call Push Request. Once the content has been transformed and stored (either for later retrieval or as a part of the Call Push Request) the Call Push Request is delivered to the voice gateway 303a. In some implementations, the voice gateway will acknowledge the request with a unique tracking ID or may not. Once the Call Push Request has been successfully received by the voice gateway, the voice gateway schedules the message delivery 304*a*.

In this example implementation, the voice gateway has the responsibility for transmitting the message to the user 305. This is accomplished by using existing telephone communications networks to trigger the user's telephone to ring. Through the voice gateway and the telephone communications networks, detection of the user answering their phone occurs. The telephone pickup triggers a call push callback 306*a*. This call push callback initiates the VXML and WAV content to be extracted by the voice gateway 307*a*. The VXML and WAV content is then decoded and played to the user over the telephone channel 308*a*.

Figure 3B:
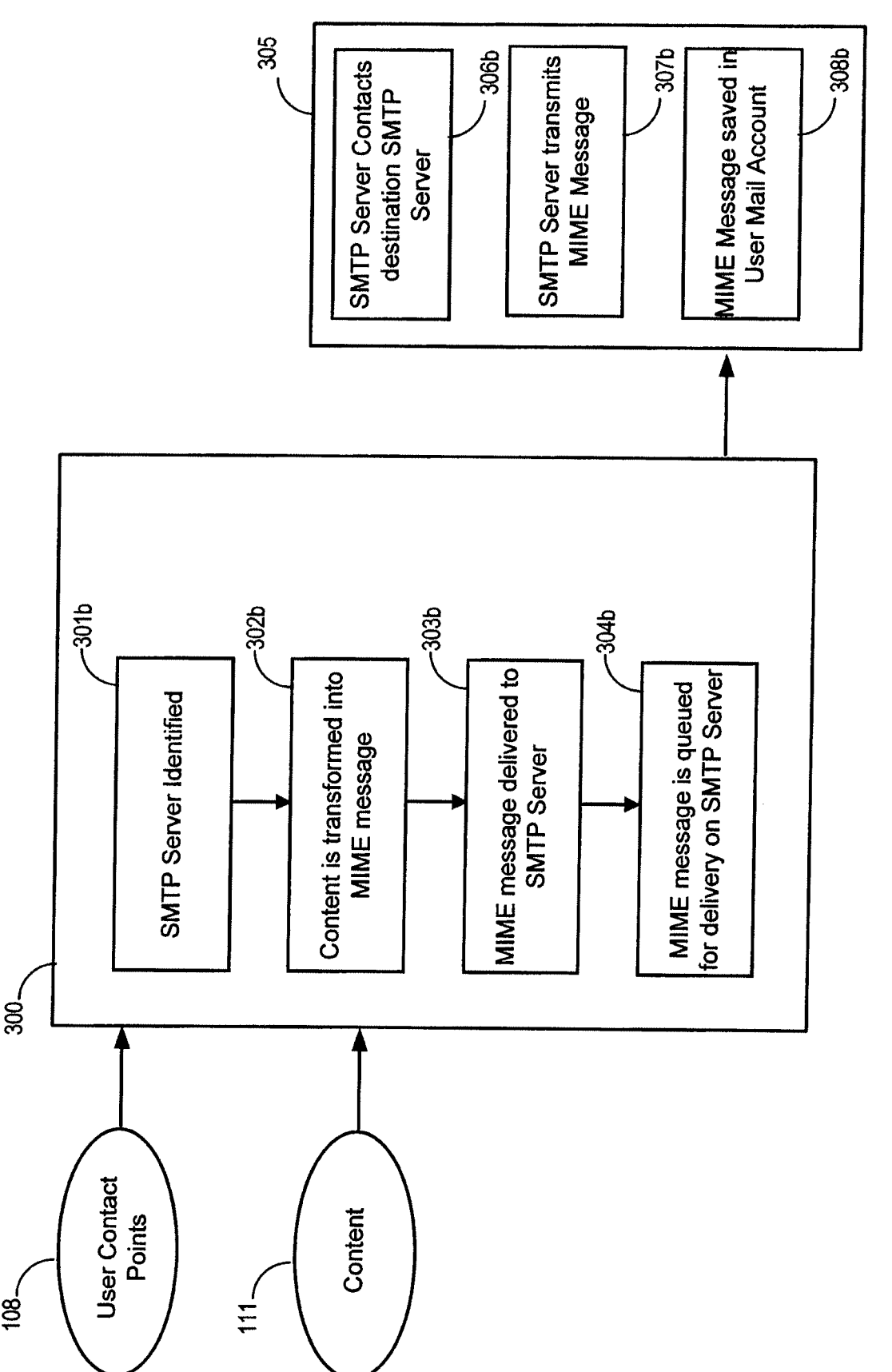

FIG. 3B is a block diagram depicting the process of delivering supplemental content to users via a Simple Mail Transfer Protocol (SMTP) email gateway. FIG. 3B represents a specific example implementation that could be implemented to conform with the SMTP protocol. Although this example assumes the SMTP protocol, other email gateway service providers may exist that may require a different protocol, and in those cases, the mechanism illustrated in FIG. 3 would need to be adapted to meet the specific requirements of these other email gateway service providers.

In this example implementation, the subsystem 300 would retrieve an email user contact point (e.g., email address) from the user contact points 108. Using the email user contact point, the subsystem would ensure that an SMTP server is identified 301*b*. In some implementations, there may be a single SMTP server, while in other implementations, the SMTP server can be selected from a plurality of SMTP Servers based upon factors such as proximity to user, service quality, service features and priority.

Once the SMTP Server has been identified, the content is transformed into a MIME message format and stored on the system 302*b*. The MIME message format is described in six Request For Comments (RFCs) from the Internet Engineering Task Force (IETF). The RFCs describing the MIME message format are RFC 2045, RFC 2046, RFC 2047, RFC 4288, RFC 4289 and RFC 2049, which together define the specification. More specifically, the MIME message transformation could happen via a number of different mechanisms. In some implementations, the message transformation could occur as part of a template where the content represents the body of the email. In other implementations, the content could be an attachment to a message. In other implementations, the content text could be extracted from another format via Speech Recognition technology or via XSLT so that the MIME message is generated dynamically from processing artifacts of the supplemental content.

Once the content has been transformed into a MIME message, the MIME message is delivered to the SMTP Server using the SMTP Protocol 303*b* as described in the SMTP RFC RFC 821 and later revisions from the IETF (which collectively define the specification). Per the SMTP protocol, the MIME message is queued for delivery on the SMTP Server 304*b*.

In this example implementation, the SMTP Server has the responsibility for transmitting the message to the user 305. This is accomplished by using steps details in the SMTP specification. In general, this process begins when the SMTP Server contacts the destination SMTP server 306*b*. The SMTP server then transmits the MIME message 307*b* to the destination SMTP server. At that point, the destination SMTP Server ensures that the MIME Message is saved in the user mail account 308*b*.

Figure 3C:
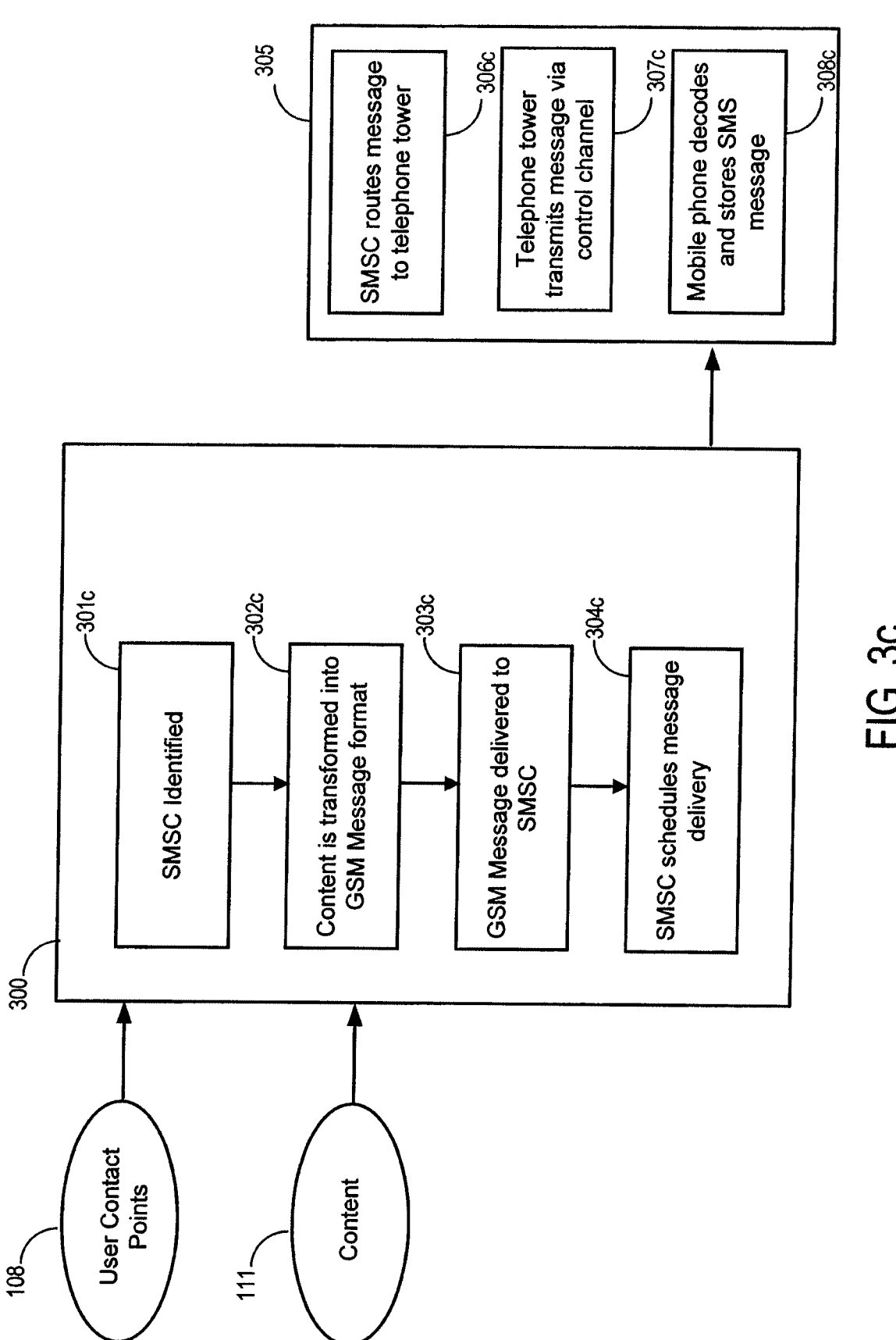

FIG. 3C is a block diagram depicting the process of delivering text based supplemental content to users via a mobile phone Short Message Service Center (SMSC) as a Short Message Service (SMS) message. FIG. 3C represents a specific example implementation that could be implemented to conform with some current commercial services that provide a SMSC capabilities. Capabilities and features of such currently available commercial services include the definition of an interface layer that takes as input a specially formatted text message over an Internet communication protocol network. Although this example assumes these features, other SMS service providers may exist that may require a different protocol and in those cases, the mechanism illustrated in FIG. 3 would need to be adapted to meet the specific requirements of these other SMS gateway service providers.

In this example implementation, the subsystem 300 would retrieve a mobile telephone user contact point (e.g., mobile telephone number) from the user contact points 108. Using the mobile telephone user contact point, the subsystem would ensure that an SMSC is identified 301*c*. In some implementations, there may be a single SMSC, while in other implementations, the SMSC can be selected from a plurality of SMSCs based upon factors such as network carrier, delivery route, service quality, service features and cost.

Once the SMSC has been identified, the content is transformed into a GSM message format 302*c* and stored for delivery. A GSM message is a text message whose binary encoding is similar to ASCII encoding except for a few multi-byte character deviations. The GSM encoding specification is a technology standard adopted globally by mobile phone carriers belonging to the Global System for Mobile Communications (GSM) Association. Transformation of content 111 on the system can be accomplished in a number of different ways. The content provider could provide GSM encoded content that is specifically suited for transmission over an SMSC, or the content provider could provide different file formats that would need to be transformed into this content via alternate means (e.g., substituting ASCII characters for their corresponding GSM characters via a lookup table). In other implementations, natural language processing and speech recognition can be employed to allow the text of the content to be extracted and encoded into a GSM text message. In other implementations, a specially formatted text document can be transformed into GSM by using a transformation algorithm (such as using XSLT to transform XML documents into a text document).

Once the content has been transformed, the GSM message is delivered to the SMSC 303*c*. In some implementations, the SMSC will acknowledge the request with a unique tracking ID or may not. Once the GSM message has been successfully received by the SMSC, the SMSC schedules the message delivery 304*c*.

The SMSC then has the responsibility for transmitting the message to the user 305. This is accomplished by using existing mobile communications networks to send the message to the user's mobile handset device. The SMSC has the ability to route the message to a cellular phone tower 306*c* connected to the user's device over various networks (and possibly through intermediate SMSCs). Once the message arrives at the telephone tower, the telephone tower transmits a message via a control channel 307*c* to the user's handset device. The mobile phone then decodes the control message and stores the SMS message 308*c*. The user is normally alerted that the message has arrived and may then read the message.

Figure 3D:
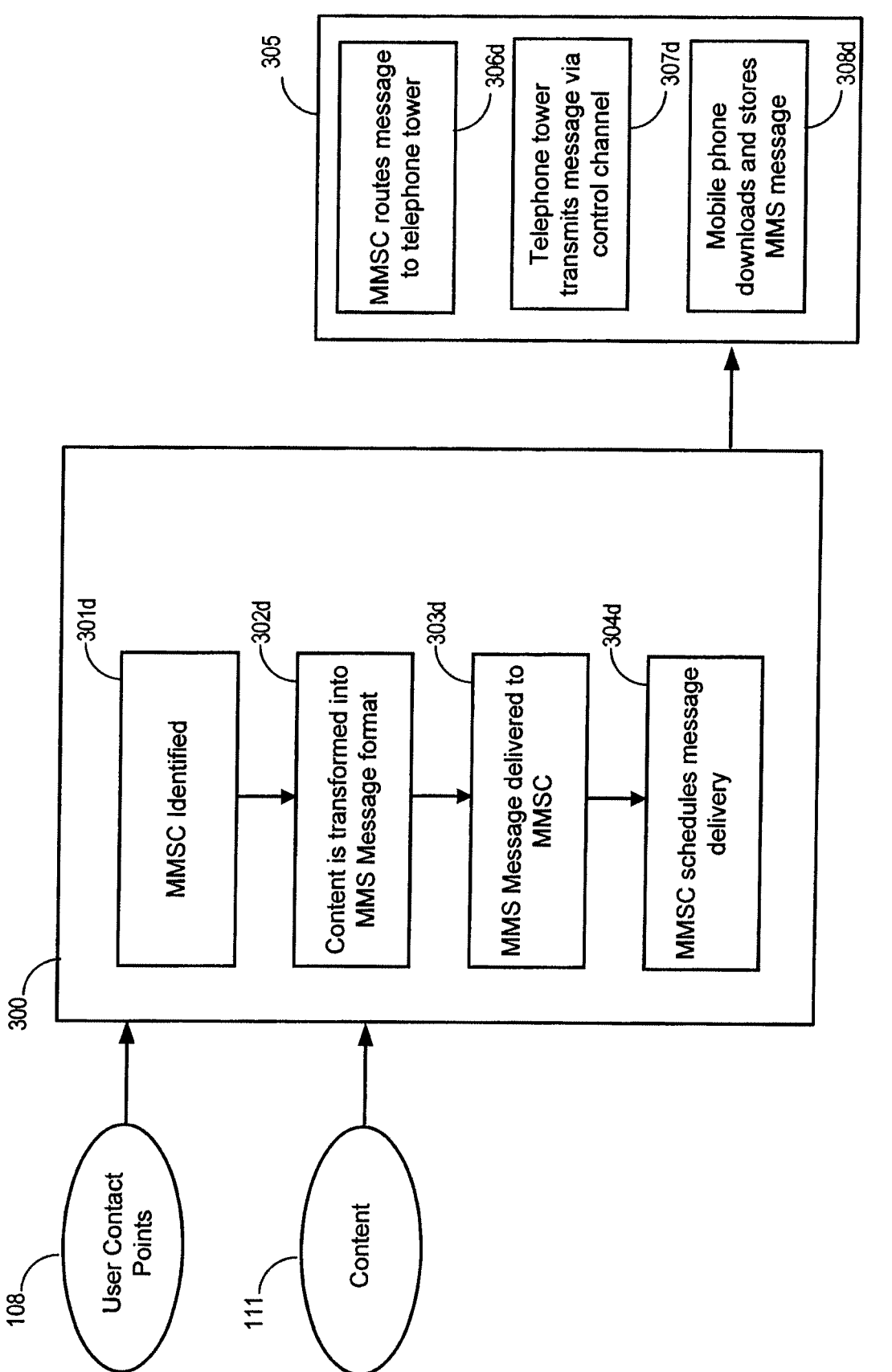

FIG. 3D is a block diagram depicting the process of delivering rich media based supplemental content to users via a mobile phone Multimedia Message Service Center (MMSC) as a Multimedia Message Service (MMS) message. FIG. 3D represents a specific example implementation that could be implemented to conform with some current commercial services that provide a MMSC capabilities. Capabilities and features of such currently available commercial services include the definition of an interface layer that takes as input a specially formatted message over an Internet communication protocol network. Although this example assumes these features, other MMS service providers may exist that may require a different protocol, and in those cases, the mechanism illustrated in FIG. 3 would need to be adapted to meet the specific requirements of these other MMS gateway service providers.

In the example implementation of FIG. 3D, the subsystem 300 would retrieve a mobile telephone user contact point (e.g., mobile telephone number) from the user contact points 108. Using the mobile telephone user contact point, the subsystem would ensure that an MMSC is identified 301*d*. In some implementations, there may be a single MMSC, while in other implementations, the MMSC can be selected from a plurality of MMSCs based upon factors such as network carrier, delivery route, service quality, service features and cost.

Once the MMSC has been identified, the content is transformed into an MMS Message encapsulated message format 302*d* and stored for delivery. An MMS Message encapsulated message format is a message whose encoding is similar to the MIME Message format. Transformation of content 111 on the system can be accomplished in a number of different ways. More specifically, as with MIME message transformation, MMS Message encapsulated message transformation could happen via a number of different mechanisms. In some implementations, the message transformation could occur as part of a template where the content represents the body of the MMS message. In other implementations, the content could be an attachment to a message. In other implementations, the content text could be extracted from another format via Speech Recognition technology or via XSLT so that the MIME message is generated dynamically from processing artifacts of the supplemental content.

Once the content has been transformed, the MMS Message encapsulated message is delivered to the MMSC 303*d*. In some implementations, the MMSC will acknowledge the request with a unique tracking ID or may not. One the MMS Message encapsulated message has been successfully received by the MMSC, the MMSC schedules the message delivery 304*d*.

The MMSC then has the responsibility for transmitting the message to the user 305. This is accomplished by using existing mobile communications networks to send the message to the user's mobile handset device. The MMSC has the ability to route the message to a cellular phone tower 306*d* connected to the user's device over various networks (and possibly through intermediate MMSCs). Once the message arrives at the telephone tower, the telephone tower transmits a message via a control channel 307*d* to the user's handset device. The mobile phone then decodes the control message and stores the MMS message 308*d*. The user is normally alerted that the message has arrived and may then read the message.

Rich media based supplemental content can be delivered to users via a variety of other channels as well. For example, supplemental content can be provided via CDMA, instant messaging (IM), social network account postings, video conferencing, as well as others. These delivery channels may utilize processes similar to those described with respect to FIGS. 3A-3D or may utilize other processes customized to that specific delivery channel.

Figure 4:
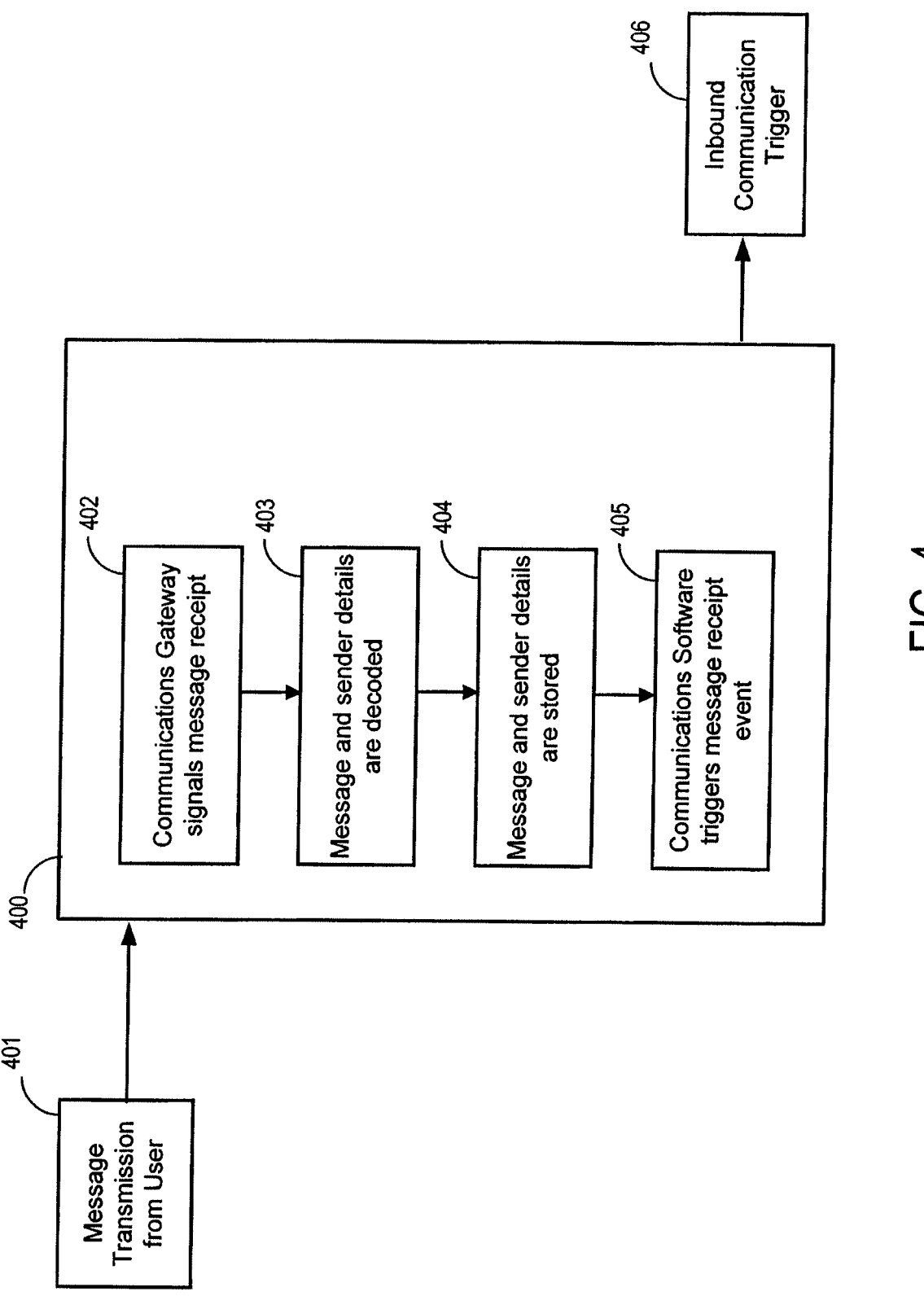
FIG. 4 is a block diagram depicting the process of receiving inbound message transmissions from users via an alternate channel.

FIG. 4 is a block diagram depicting the process of receiving inbound message transmissions from users via an alternate channel. This inbound message transmission may be delivered via any communications medium but FIGS. 4A-4D are block diagrams depicting example processes for receiving inbound message transmissions via Voice Telephone, email, SMS and MMS. Implementations could further be described through Instant Messaging gateways, Social Networking, Video Conferencing or other communications medium. Each additional implementation of other communications medium will follow the method illustrated by FIG. 4.

When the user transmits a message, the message transmission from the user 401 is processed by the subsystem 400 which results in an inbound communication trigger 406. Since the communications gateway is the endpoint destination from the communications network standpoint, the communications gateway will signal message receipt 402. Once the message receipt has occurred, the message and sender details are decoded 403. Message and sender details are then stored 404. The communications software will then trigger a message receipt event 405 which is then placed on the communications bus as an inbound communication trigger 406.

Figure 4A:
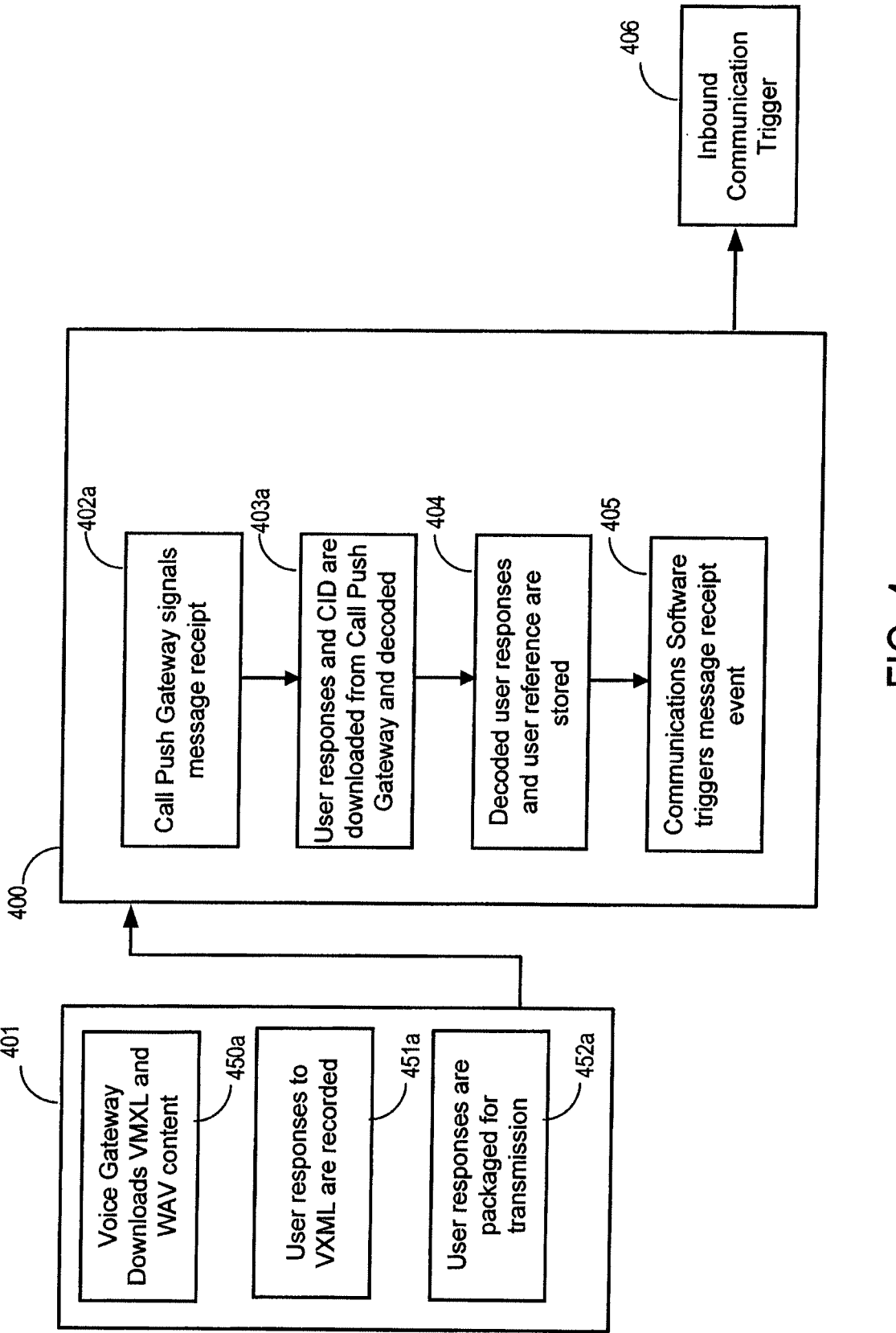
FIGS. 4A-4D are block diagrams depicting example processes for receiving inbound message transmissions via Voice Telephone, email, SMS and MMS.

FIG. 4A is a block diagram depicting the process of receiving inbound message transmissions from users via a telephone gateway. FIG. 4A represents a specific example implementation that could be implemented to conform with some current commercial services that provide voice gateway capabilities as described for illustration FIG. 3A. Although this example assumes features of a specific commercial voice gateway service, other voice gateway service providers may exist that may require a different protocol. In those cases, the mechanism illustrated in FIG. 4 would need to be adapted to meet the specific requirements of these other voice gateway providers.

In this example implementation, the Message Transmission from the User 401 is processed by the voice gateway service before being delivered to the subsystem 400. When the user initiates a call to the voice gateway service, the voice gateway will download VXML or WAV content 450*a*. This VXML or WAV content is used to collect user responses 451*a*. User responses are then packaged for transmission to the communication software 452*a*.

The Call Push Gateway will then signal message receipt 402*a* by making a connection to the communications software over and HTTP status port. Via either a PUSH or PULL method, (i.e., as part of the message receipt data body or because the communications software contacts the Call Push Gateway on a second port) user responses and source address (Caller ID or CID) are downloaded from the Call Push Gateway and decoded 403*a*.

In some implementations, not unique to the voice channel, but common in it, the inbound message delivery of voice can cause the mechanism of subsystem 400 to occur multiple times in a single communications sequence. For instance, the user may call a special telephone number which causes a message of "connecting" to the communications software. The inbound communications trigger in conjunction with the downloaded VXML could cause additional, dynamic VXML to be downloaded that is specific to whatever content the user is currently consuming (as determined from polling the user contact points 108, user history 109 and content 111 elements). The user may be played a particular message and then be prompted to leave a recording. This recording would result in the voice gateway packaging the recording for transmission which is then eventually decoded by the communications software finally becoming a second inbound communication trigger 406.

Figure 4B:
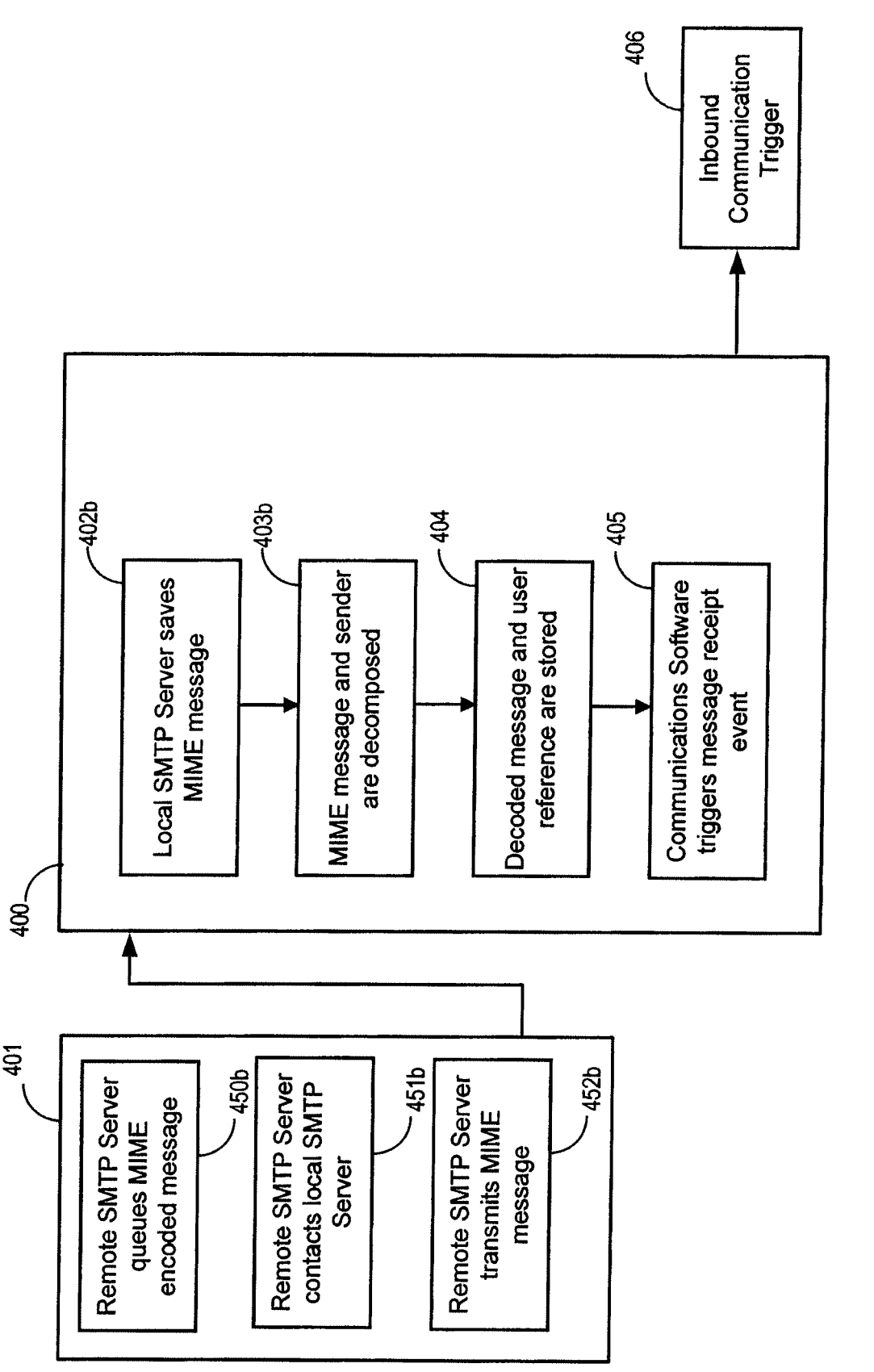

FIG. 4B is a block diagram depicting the process of receiving inbound message transmissions from users via an SMTP server. FIG. 4B represents a specific example implementation that could be implemented to conform with the SMTP protocol as described for illustration FIG. 3B. Although this example assumes features of the SMTP specification, other email gateway service may providers exist that may require a different protocol. In those cases, the mechanism illustrated in FIG. 4 would need to be adapted to meet the specific requirements of these other email gateway providers.

In this example implementation, the message transmission from the user 401 is processed by a remote SMTP server before being delivered to the subsystem 400. When the user initiates an email to the remote SMTP server, the remote SMTP server will queue the user generated MIME encoded message 450b. Once the MIME message has been queued, the remote SMTP server can contact a local SMTP server 451b. A local SMTP server is one which the communications software is able to monitor for new messages. Once the remote SMTP server is connected to the local SMTP server, it transmits the MIME message 452b that originated from the user.

The local SMTP server will then save the MIME message 402b, which allows the communications software to detect that a new message has arrived. The communications server is then able to obtain the MIME message, and the message (or message parts) and sender (email address) are decomposed 403b into a usable format.

Figure 4C:
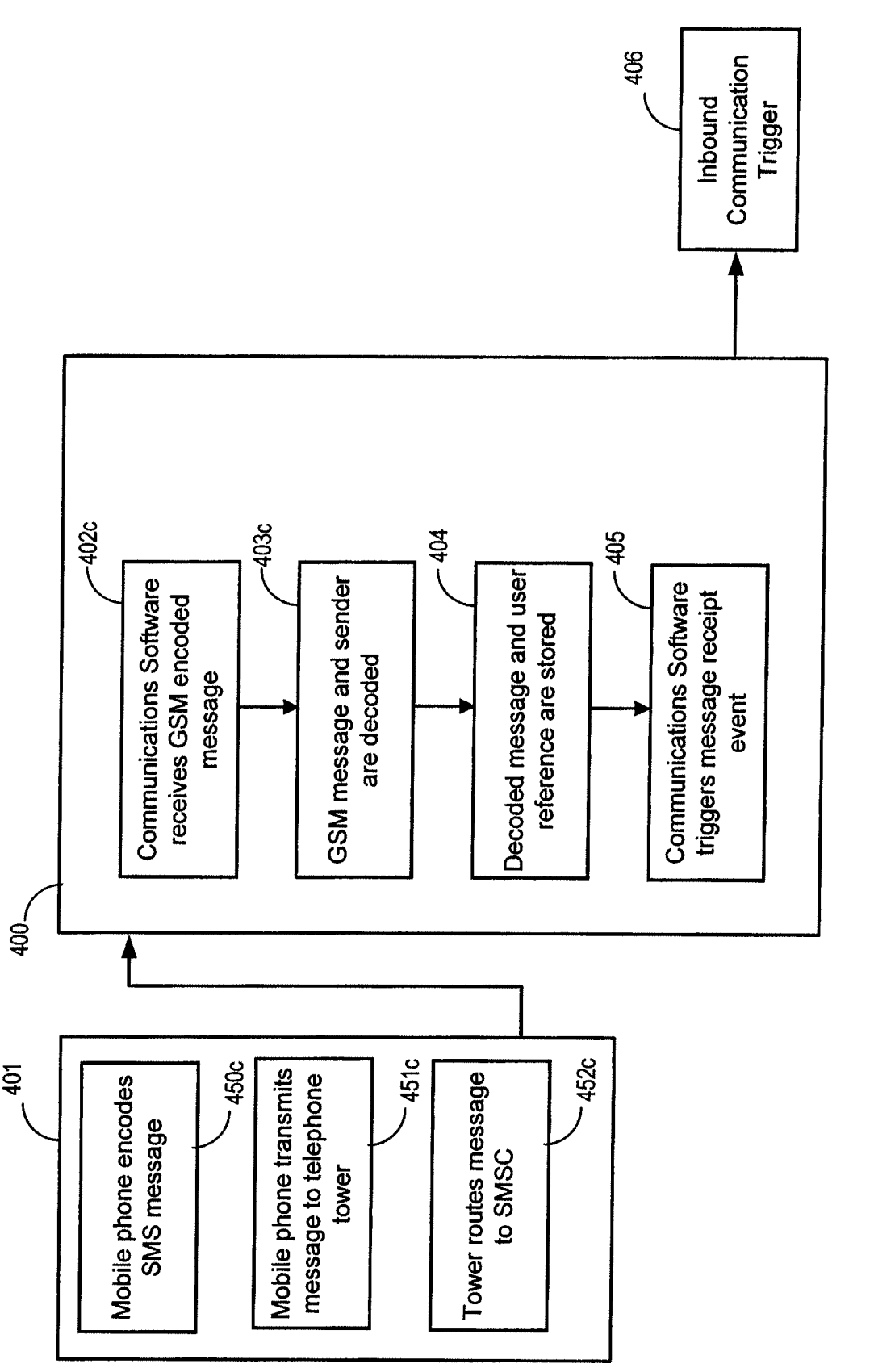

FIG. 4C is a block diagram depicting the process of receiving inbound message transmissions from users via an SMSC. FIG. 4C represents a specific example implementation that could be implemented to conform with some current commercial services that provide SMSC capabilities as described for illustration FIG. 3C. Although this example assumes features of a specific commercial SMSC, other SMS gateway service providers may exist that may require a different protocol. In those cases, the mechanism illustrated in FIG. 4 would need to be adapted to meet the specific requirements of these other SMS gateway providers.

In this example implementations, the Message Transmission from the User 401 is processed by a remote mobile phone communications network before being delivered to the subsystem 400. When the user initiates a text message, the mobile phone encodes the text message 450c into a GSM encoded message format. The mobile phone transmits the message to a telephone tower 451c using the GSM control signal. The tower then routes the message to the SMSC 452c recognized by the communications software (possibly through intermediate SMSCs and alternate networks).

The Communications software then receives the GSM encoded message 402c from the SMSC. The GSM message and sender (e.g., mobile phone number) are decoded 403c into a usable format (e.g., from GSM encoded data to ASCII encoded data).

Figure 4D:
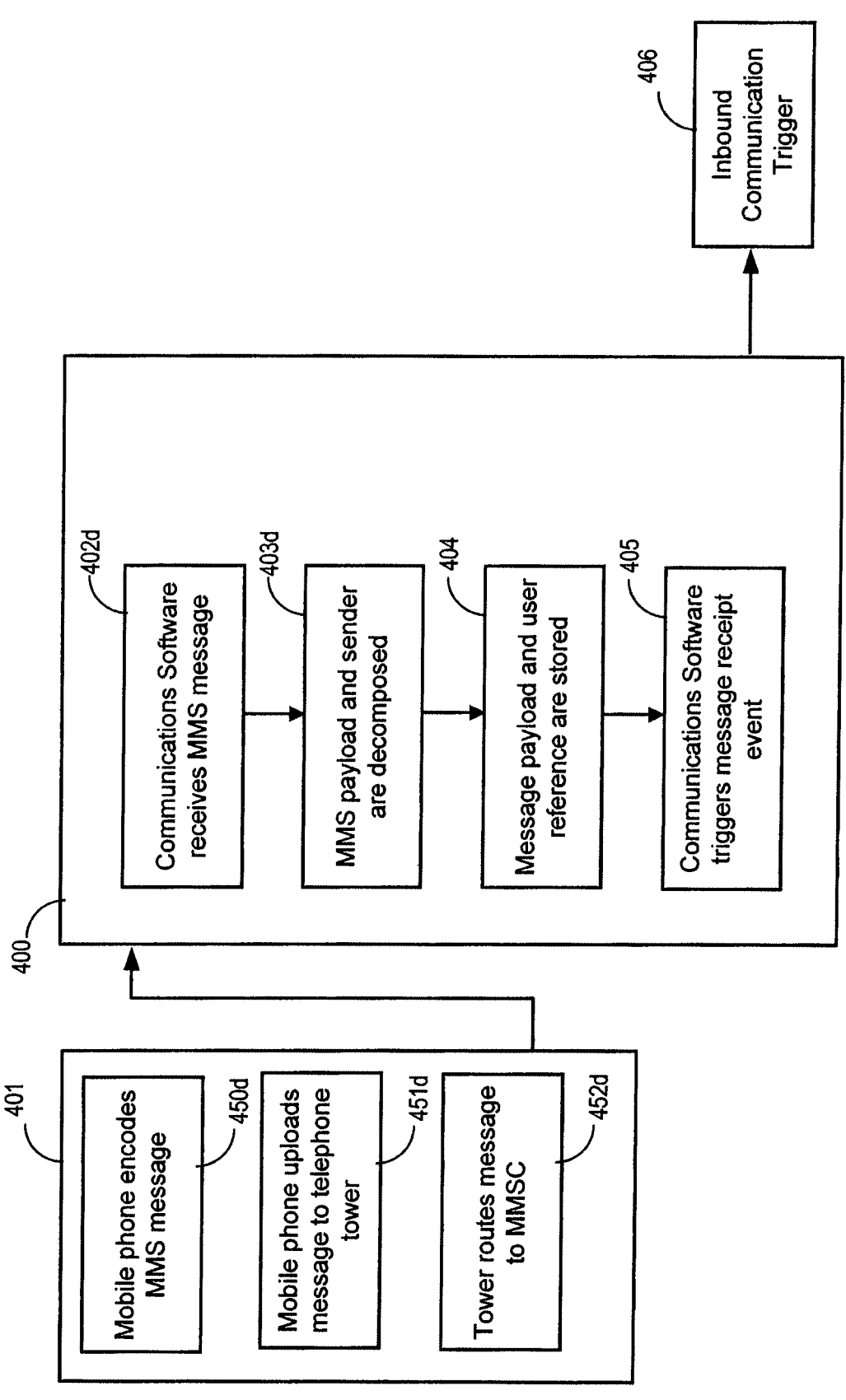

FIG. 4D is a block diagram depicting the process of receiving inbound message transmissions from users via an MMSC. FIG. 4D represents a specific example implementation that could be implemented to conform with some current commercial services that provide MMSC capabilities. Although this example assumes features of a specific commercial MMSC, other MMS gateway service providers may exist that may require a different protocol. In those cases, the mechanism illustrated in FIG. 4 could be adapted to meet the specific requirements of these other MMS gateway providers.

In the example implementation of FIG. 4D, the Message Transmission from the User 401 is processed by a remote mobile phone communications network before being delivered to the subsystem 400. When the user selects content for the MMS message, the mobile phone encodes the content into an MMS encapsulated message 450c. The mobile phone transmits the MMS message to a telephone tower 451c using the GSM control signal. The tower then routes the message to the MMSC 452c recognized by the communications software (possibly through intermediate MMSCs and alternate networks).

The Communications software then receives the MMS message 402c from the MMSC. The MMS message parts and sender (e.g., mobile phone number) are decoded 403c into a usable format (e.g., an image, video clip or content bundle).

Users can provide message transmissions via a variety of other channels as well. For example, users can transmit messages via CDMA, instant messaging (IM), social network account postings, video conferencing, and other channels. These channels may utilize processes similar to those described with respect to FIGS. 4A-4D or may utilize other processes customized to that specific channel.

Figure 5:
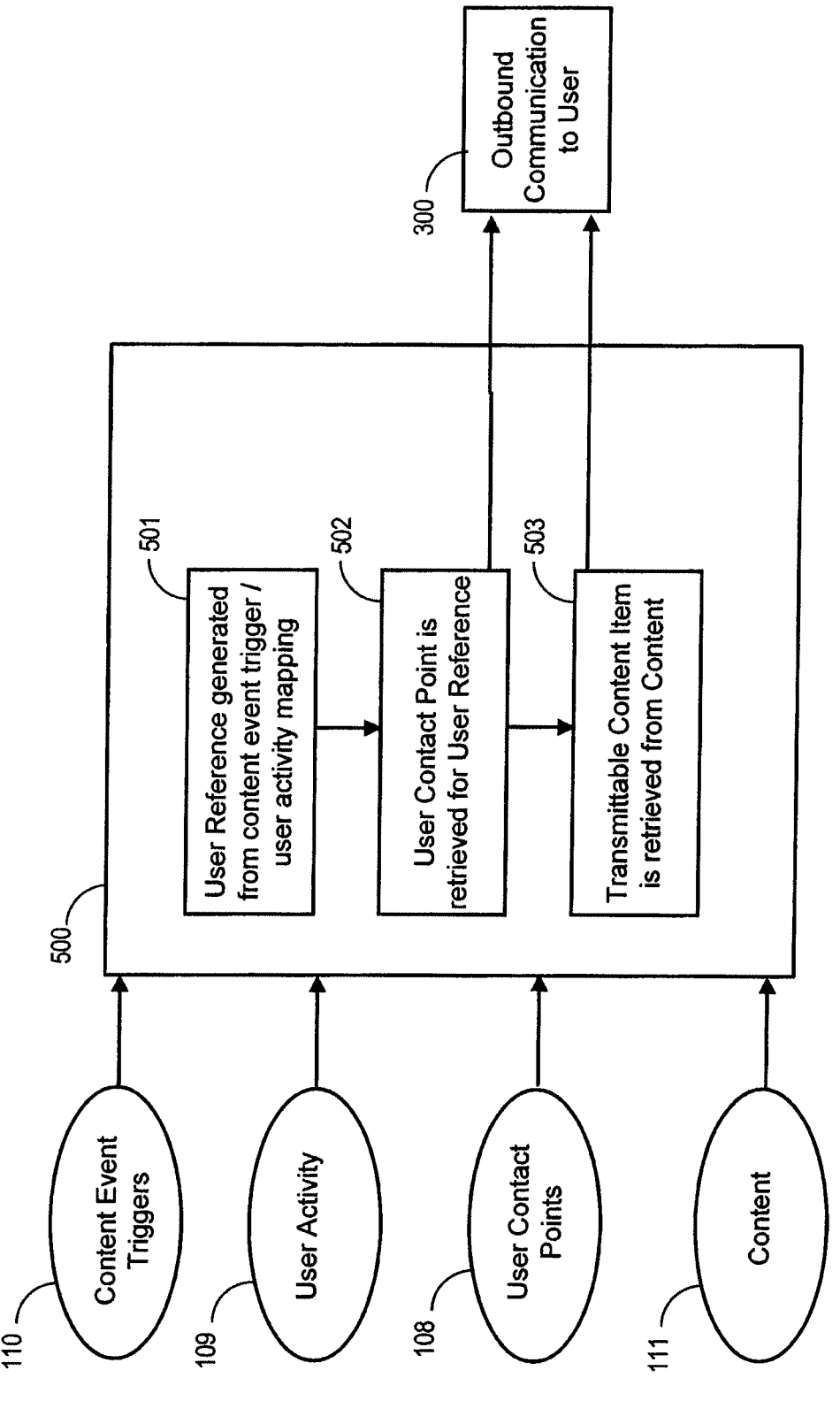
FIG. 5 is a block diagram depicting the process of sending outbound supplemental content based on detection of a content event trigger.

FIG. 5 is a block diagram depicting the process of sending outbound supplemental content based on detection of a content event trigger. As the content 111 is streamed to the media player for a user, the subsystem 500 will detect an event matching a content event trigger 110. In some implementations, the content event trigger will be detected based upon the time index of a particular piece of content (e.g., when file_456.m4v has reached the $13^{th}$ second of play). In other implementations, a content event trigger 110 will be detected due to content recognition technology (e.g., when the words "stick em' up" have been spoken by a character in the content or when the sound of a phone ringing has been matched). In other implementations a content event trigger 110 will be detected due to the transition from one content file to another (e.g., moving from scene 1 to scene 2). When the content event trigger has been detected, the associated content stream reference can be used to lookup a user reference in the user activity 109. In other words, a user reference is generated from content event trigger user activity mapping 501. In some implementations, when the stream has been started, a unique stream identifier is linked to a unique user identifier and stored in user activity 109. In these implementations, having the unique stream identified that triggered the content event trigger can be used to do a lookup for a user in the user activity 109.

Another component of the content event trigger can include a reference to supplemental content (e.g., when this event happens, send the picture file_abc.png) and a reference to a delivery type for a user (e.g., when the event happens, send content to the user's mobile phone via MMS). Having identified the user and the contact point destination type, the system can then perform a lookup for the contact point destination type for the particular user from the user contact points 108. In other words, a user contact point is retrieved for the user reference 502.

Knowing the reference to supplemental content, the system can ensure that transmittable content item is retrieved from content 503. The supplemental content and user contact point are then used as inputs into the subsystem described in FIG. 3 and further exemplified by FIGS. 3A-3D.

Figure 6:
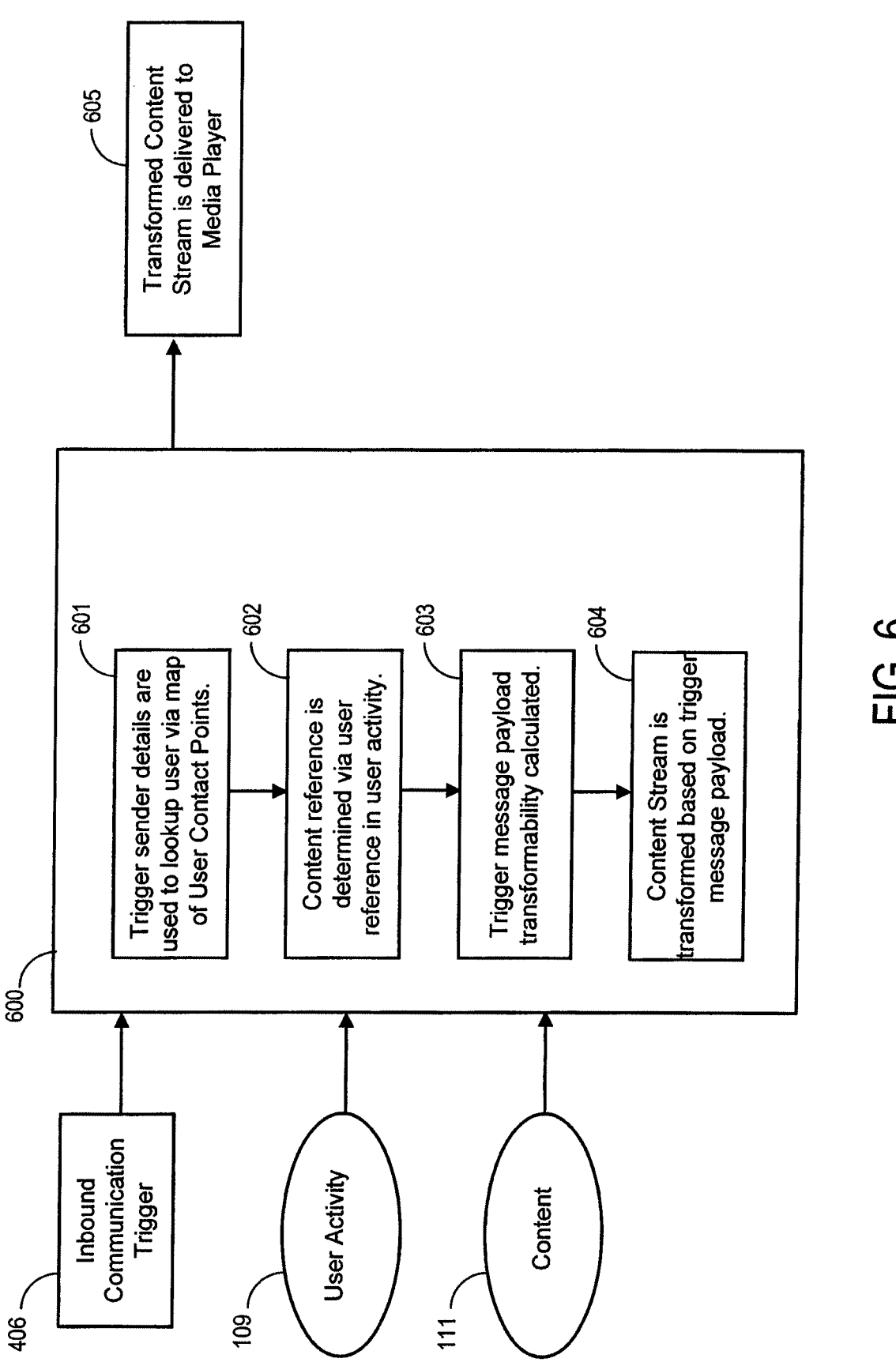
FIG. 6 is a block diagram depicting the process of transforming the content stream based on an inbound communication trigger.

FIG. 6 is a block diagram depicting the process of transforming the content stream based on an inbound communication trigger. When an inbound communication trigger 406 is received, the subsystem 600 will use the trigger details to lookup a user reference via message sender details matching a particular user contact point 601. In some implementations, the inbound communication trigger 406 will contain a reference to a user contact point. In other implementations, the inbound communication trigger will contain a direct user reference due to the fact that the user reference was derived from the message sender details in the process described in FIG. 4.

Once the user reference has been derived, the system can use the user reference to determine a content stream reference identifying the content with which the incoming user communication is associated. Such a determination may be performed via a lookup in the user activity 109 for all content streams for the referenced user. In some implementations, additional information can be used to further refine the results that are returned from the user activity 109 by comparing the additional information in the inbound communication trigger with data that is stored as data and metadata for the content 111. For example, the user may be consuming multiple content streams, so the system would filter content streams that do not recognize inbound communications triggers matching the data of the trigger. An example of this type of filter would remove all content streams that cannot process an SMS message when the inbound communication trigger originated from an SMS sender.

In some implementations, a destination address included in an inbound communication trigger can be used to map to a particular content stream or content streams in a plurality of content streams. Thus, content streams that do not map to the inbound communications trigger message destination addresses would be removed from the list of content streams that could be processed. An example of this type of filter would remove content streams that are capable of processing messages from a voice telephone system but which are not mapped to the phone number that the user dialed when sending the message. To further refine this example, assume that there are two movies each with a character playing a detective. Each detective has a telephone number printed on a business card which is shown in a particular scene of the movie. The first movie's detective has phone number 555-555-1234, and the second movie's detective has phone number 555-555-5678. When the user calls 555-555-1234, the system can see that the first movie is the only content that has been mapped to 555-555-1234 because the second phone number, 555-555-5678, is mapped to another movie.

Once the content stream reference is determined via user reference in user activity 602, the message payload transformability is determined 603. The system determines whether the content stream needs to be transformed and if so, in what way. For example, the content 111 may contain metadata signaling that if an SMS message containing certain keywords (such as "don't go in", "watch out", "stop" or "danger") is received by time index 1:23 on the content stream, than the content in the content stream is to be changed so that a version where a particular character in the content does not enter a dangerous situation. Another example of this determination could include content 111 that contains data signaling dictating that if a voice telephone message is received by time index 4:56 on the content stream, than the recording of the user's voice over the telephone channel would be combined (or transposed) with the communication stream. This could be manifested for a user by the media player playing the user's voice through the media player in a section of the content at a point where the characters are checking voicemail as part of the story.

Additional technologies can be used to trigger the message payload transformability determination. For example, in the case that the inbound communication trigger message payload contains a recording of a user's voice, speech recognition software can be employed to look for appropriate spoken keywords. As another example, if the inbound communication trigger message payload contains an image this image can be compared to an existing image in the content 111. This could be useful in a story line such as when a murder-mystery is in play and the user was sent a clue via MMS using processes described earlier in this disclosure. The user may decide to forward the message to a detective character in the story via the process described here. This image would then be compared to the originally sent message, and if it is the same image, the content can be transformed to accommodate a story line where a vital clue has been given to the appropriate character in the story.

In other implementations, more complicated rich media detection mechanisms can be deployed to analyze the inbound communication trigger message payloads to detect whether the content stream should be transformed and in what way. This could include more complicated features such as facial recognition software to detect that a picture or video of an actor that is included from an external source (such as IMDB.com) matches the actor who plays a character in the stream.

Once the transformability has been determined, the content stream will be transformed 604. This transformed content stream is delivered to the media player 605. The media player will then decode the content and play it for the user.

FIGS. 7A-12 depict example interactive experiences that could be achieved through various implementations of the system. The examples in these figures are generally given in the context of a user watching a video on a television in order for the distinctions in the examples to be most clearly seen. However other implementations could use other content formats (e.g., e-book or audio-only as in FIGS. 7B-7C) or on other types of media players (e.g., a PC, portable device, or e-book reader).

FIG. 7A depicts an example user viewing experience where the user receives outbound supplemental MMS content based on detection of a content event trigger. In cell 1, the user is provided video content where a robbery occurs. In cell 2, the victim character attempts to escape from the robber character and takes a picture of the attacker with the victim character's camera phone. On the system, a content event trigger is detected based on a content tag, cue, cue-point, time index or similar.

This content event trigger causes the system to send supplemental content to the user over the MMS channel. The MMS message is scheduled for delivery. In cell 3, the user's handset device receives the message, and the user's phone beeps to signal that a new message is available for viewing. In cell 4, the user opens the MMS message and views the supplemental content.

FIG. 7B depicts an example user experience while reading an electronic book (e-book) where the user receives outbound supplemental MMS content based on detection of a content event trigger. In cell 1, the user is provided e-book content. In cell 2, the user reads a description of a large chest with golden handles. On the system, a content event trigger is detected based on a content tag, cue, cue-point, time index, page number or similar event.

This content event trigger causes the system to send supplemental content to the user over the MMS channel. The MMS message is scheduled for delivery. This message is delivered to the user's handset device, which then beeps to signal that a new message is available for viewing. In cell 3, the user opens the MMS message and views the supplemental content, a picture of the large, golden chest.

FIG. 7C depicts an example user experience while listening to an audio content stream where the user receives outbound supplemental MMS content based on detection of a content event trigger. In cell 1, the user hears a description of a large chest with golden handles. In cell 2, a content event trigger is detected based on a content tag, cue, cue-point, time index, page number or similar event.

This content event trigger causes the system to send supplemental content to the user over the MMS channel. The MMS message is scheduled for delivery. This message is delivered to the user's handset device, which then beeps to signal that a new message is available for viewing. In cell 3, the user opens the MMS message and views the supplemental content (a picture of the large, golden chest).

FIG. 8A depicts an example user viewing experience where the content stream is transformed based on an inbound communication trigger from a user generated SMS message. In cell 1, the user observes video content where detective character is about to enter the hideout of a gang of criminals. In cell 2, the user observes video content including information about the story that is unavailable to the detective character. Based on this video content, the user recognizes a dangerous situation for the detective character. In cell 3, the user decides to pass this information to the detective character in order to avoid a situation where the detective is placed in danger. In cell 4, the content stream is transformed so that the detective character receives the message. In cell 5, the content stream continues to play the results of the transformation, playing a story that now causes the character to defer entry into the dangerous situation. In cell 6, this story line concludes with the character continuing their course of action after the dangerous situation has been mitigated.

FIG. 8B depicts an example user viewing experience where the inbound communication trigger described in FIG. 8A is never generated and so the content stream remains untransformed. In cell 1, the user observes video content where detective character is about to enter the hideout of a gang of criminals. In cell 2, the user observes video content including information about the story that is unavailable to the detective character. At this point, the content streams from FIG. 8A and FIG. 8B are identical. Because in FIG. 8B the user sends no SMS information, cell 3 now displays the detective character entering the hideout of the villain characters and is then shot. In cell 4, the detective calls for assistance. In cell 5, other characters come to the aid of the detective character, causing the villains to flee. In cell 6, the detective character is sent to the hospital.

Figure 9:
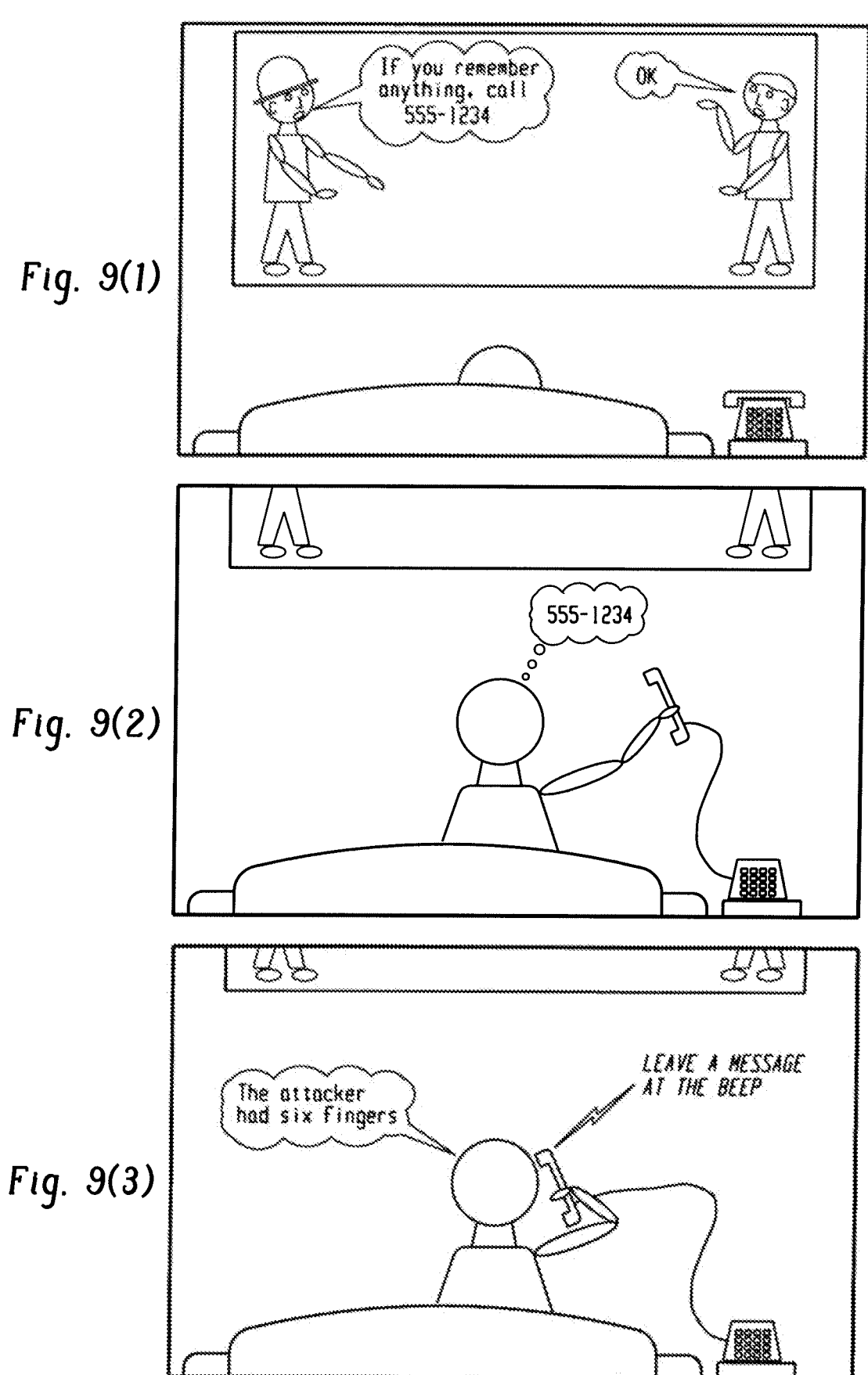
FIGS. 9(1)-(6) depicts an example user viewing experience where content stream is transformed based on an inbound communication trigger from a user generated voice telephone message.
Figure 9:
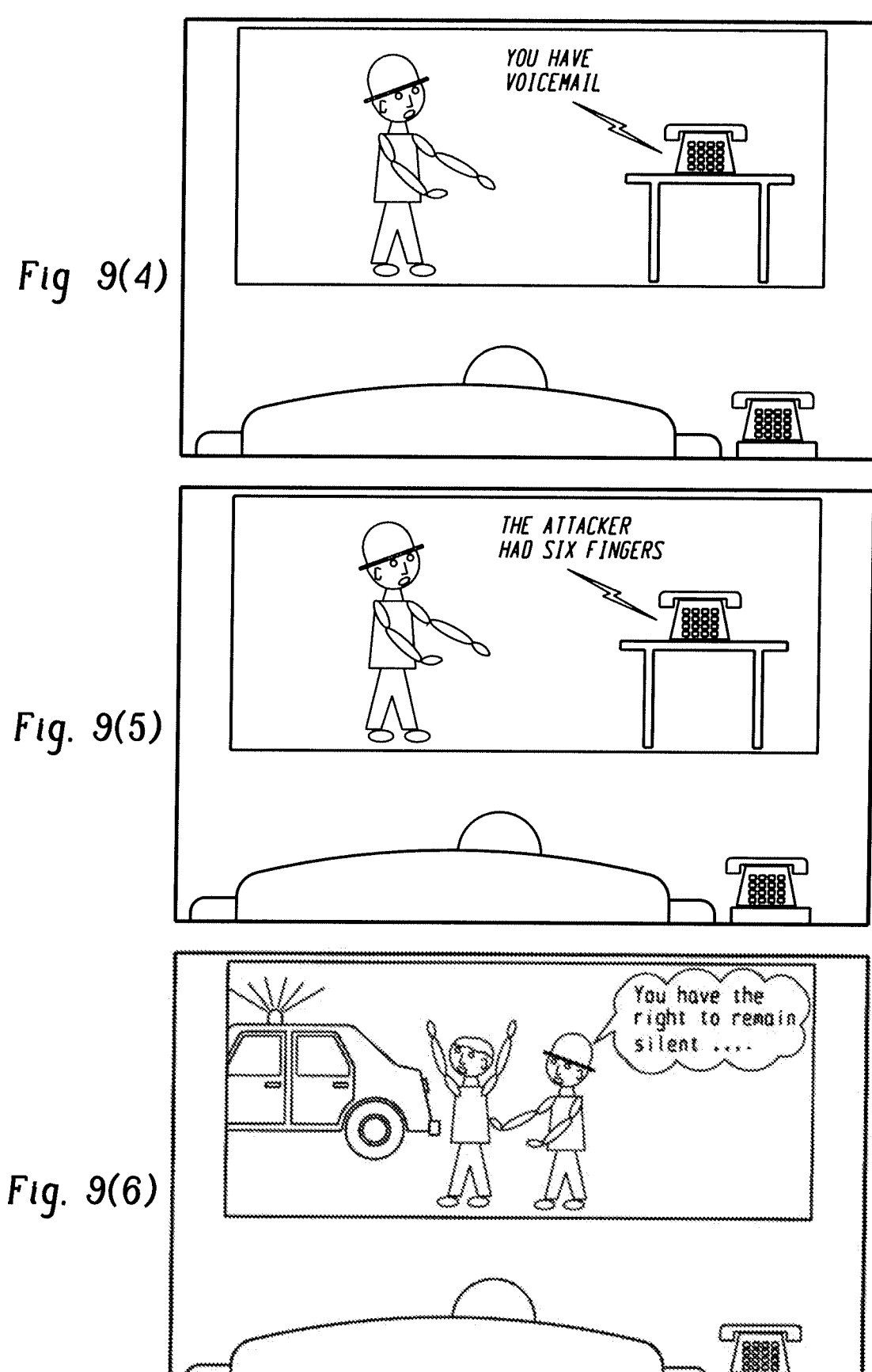

FIG. 9 depicts an example user viewing experience where content stream is transformed based on an inbound communication trigger from a user generated voice telephone message. In cell 1, the user observes a detective character speaking with a potential witness and giving instructions on how to create an investigative lead. In cell 2, the user, observing these instructions, calls the number via voice telephone which generates an inbound communication trigger for the system. This inbound communication trigger generates a transformed content stream on the telephone channel which is delivered to the user via the voice channel. This transformed content prompts the user to leave a message in cell 3, to which the user responds with the message, "The attacker had 6 fingers." The content stream is then transformed in three ways. In the first transformation shown in cell 4, a video clip showing the checking of voicemail is inserted into the content stream. In a second transformation shown in cell 5, the recorded user's voice has been merged into the audio channel of the content stream. In a third transformation in cell 6, the content stream plays the video clip where the criminal is captured due to the clue that the user generated.

Figure 10:
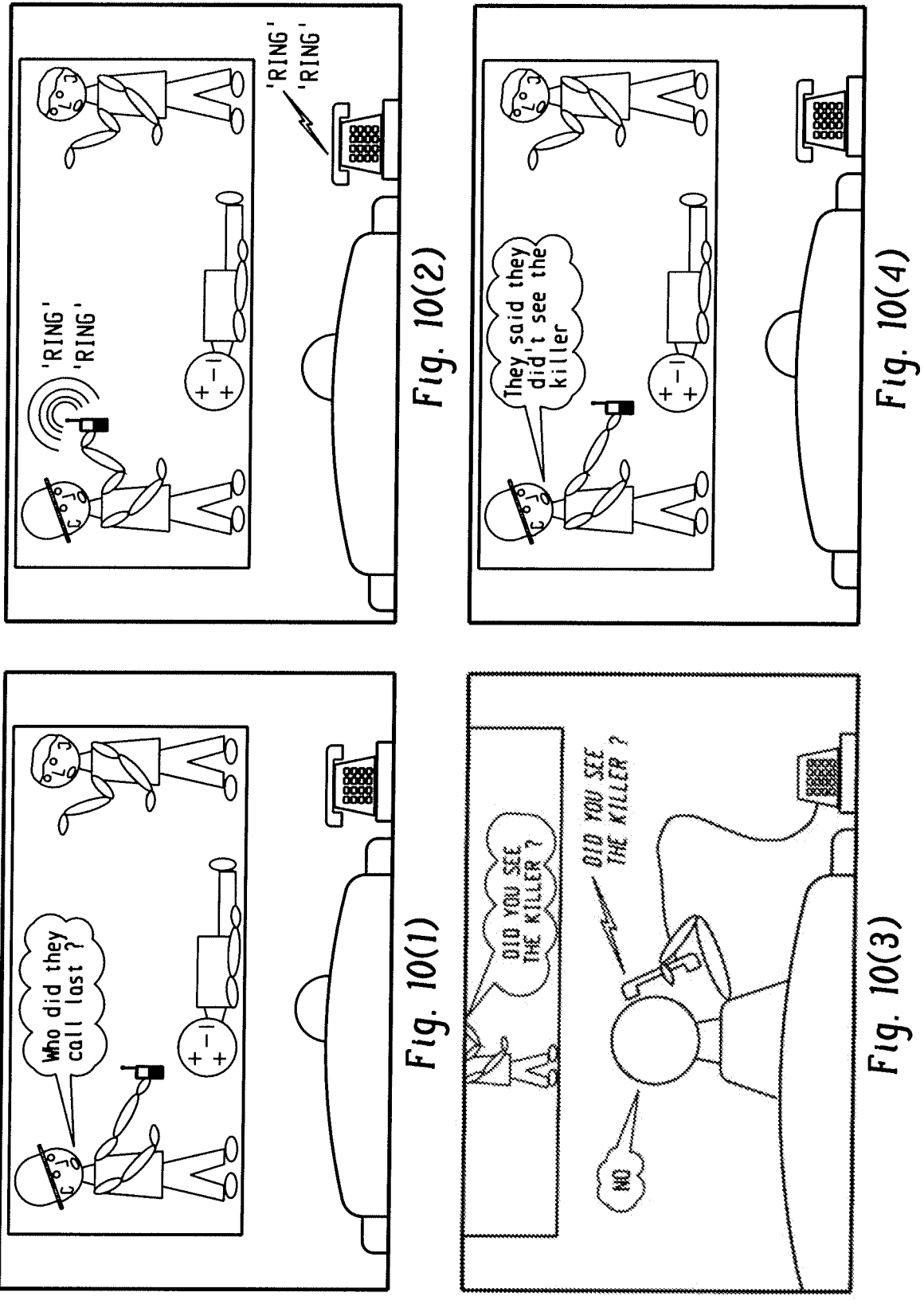
FIGS. 10(1)-(4) depicts an example user viewing experience that combines both an outbound supplemental voice telephone content event trigger and an inbound communication trigger from the user generated response to the supplemental voice telephone content.

FIG. 10 depicts an example user viewing experience that combines both an outbound supplemental voice telephone content event trigger and an inbound communication trigger from the user generated response to the supplemental voice telephone content. In cell 1, the user is observing video content that shows that a fictional crime has occurred but where no clues regarding the crime have been presented to the user. In cell 2, a detective character finds a cell phone of the fictional victim and finds a number in the victim's phone directory that has been "recently added," which is inferred to be the user's number. As a matter of protocol, the detective calls the user's voice telephone number. On the system, a content event trigger is detected based on a content tag, cue, cue-point, time index or similar at this point.

This content event trigger causes the system to send supplemental content to the user over the voice telephone channel that is in sync with the content played in the media player. Specifically, the user hears the detective character ask the user for a clue both over the voice channel and through the content stream in cell 3, to which the user responds "no." This response is processed (e.g., using speech recognition) as an inbound communication trigger, which then transforms the content stream so that the detective character is shown to say that the user had no clues to offer.

Figure 11:
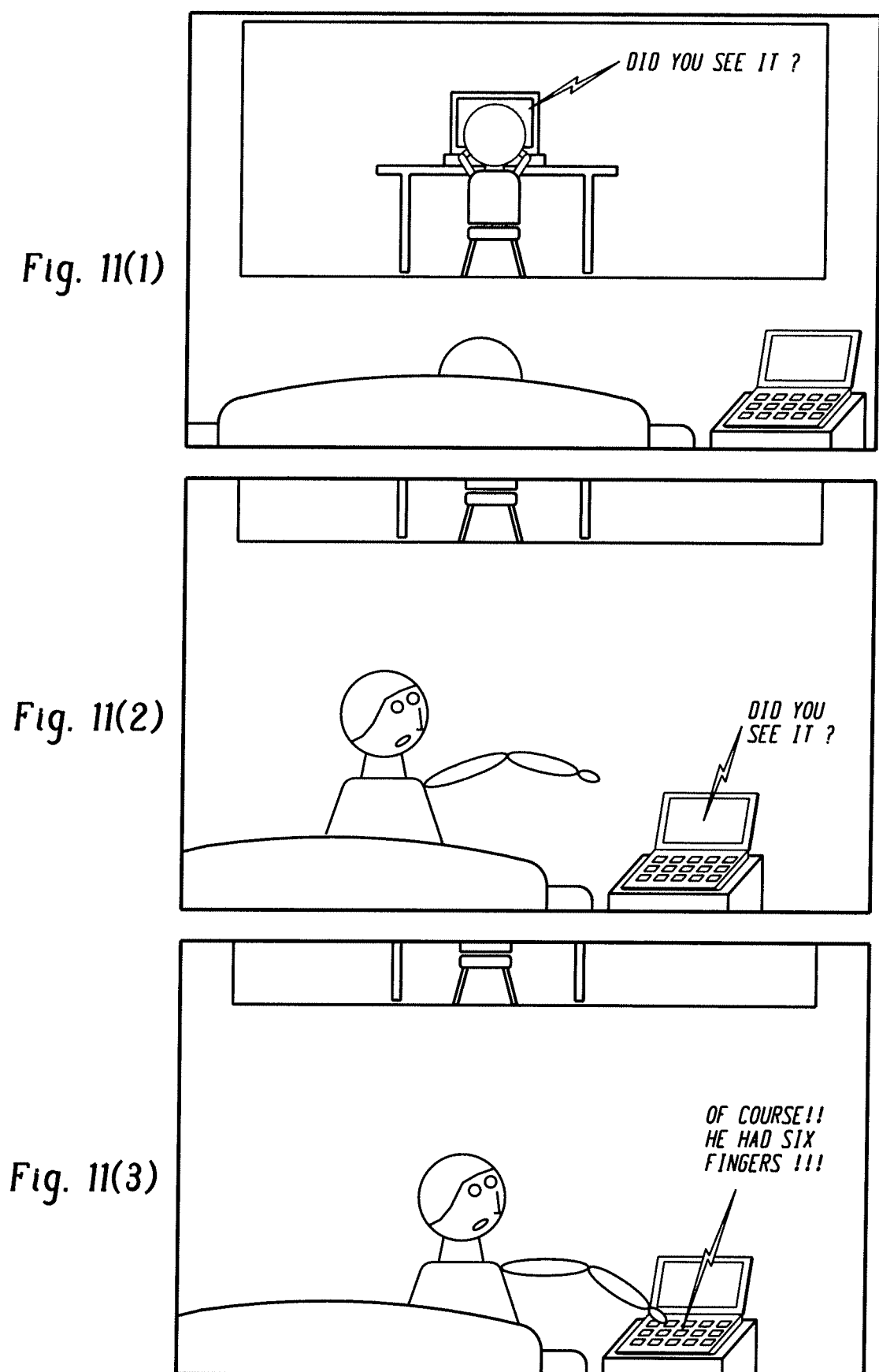
FIGS. 11(1)-(6) depicts an example user viewing experience that combines both an outbound supplemental email content event trigger and an inbound communication trigger from the user generated in response to the supplemental email content.
Figure 11:
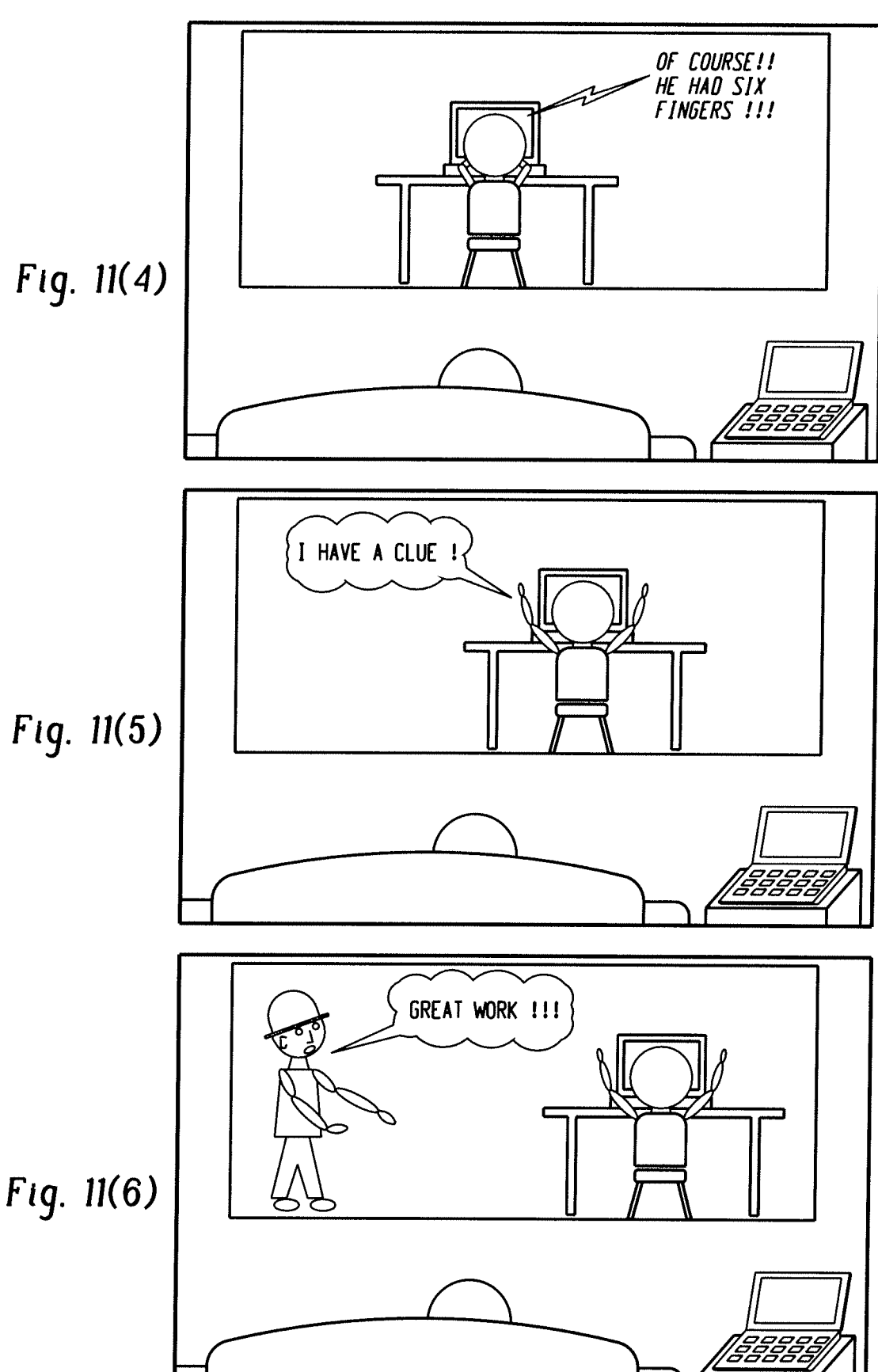

FIG. 11 depicts an example user viewing experience that combines both an outbound supplemental email content event trigger and an inbound communication trigger from the user generated in response to the supplemental email content. In cell 1, the user observes video content that shows a fictional detective character sending an email asking for clues about a fictional crime. On the system, a content event trigger is detected based on a content tag, cue, cue-point, time index or similar at this point.

This content event trigger causes the system to send supplemental content to the user over the email channel that is received by the user's email client in cell 2. In cell 3, because the user saw, earlier in the content stream, that the fictional criminal had 6 fingers, the user responds to the email stating so.

The system processes the inbound communication trigger and transforms the content stream in two ways. The first transformation occurs in cell 4 where the user's message is merged into the content stream so that the user can see the message that was sent through the video player. The second transformation occurs in cell 5 where the content stream plays a scene where the fictional detective character recognizes that the user has sent a relevant clue. In cell 6, the user observes the content stream continue to play based on the transformed story line.

Figure 12:
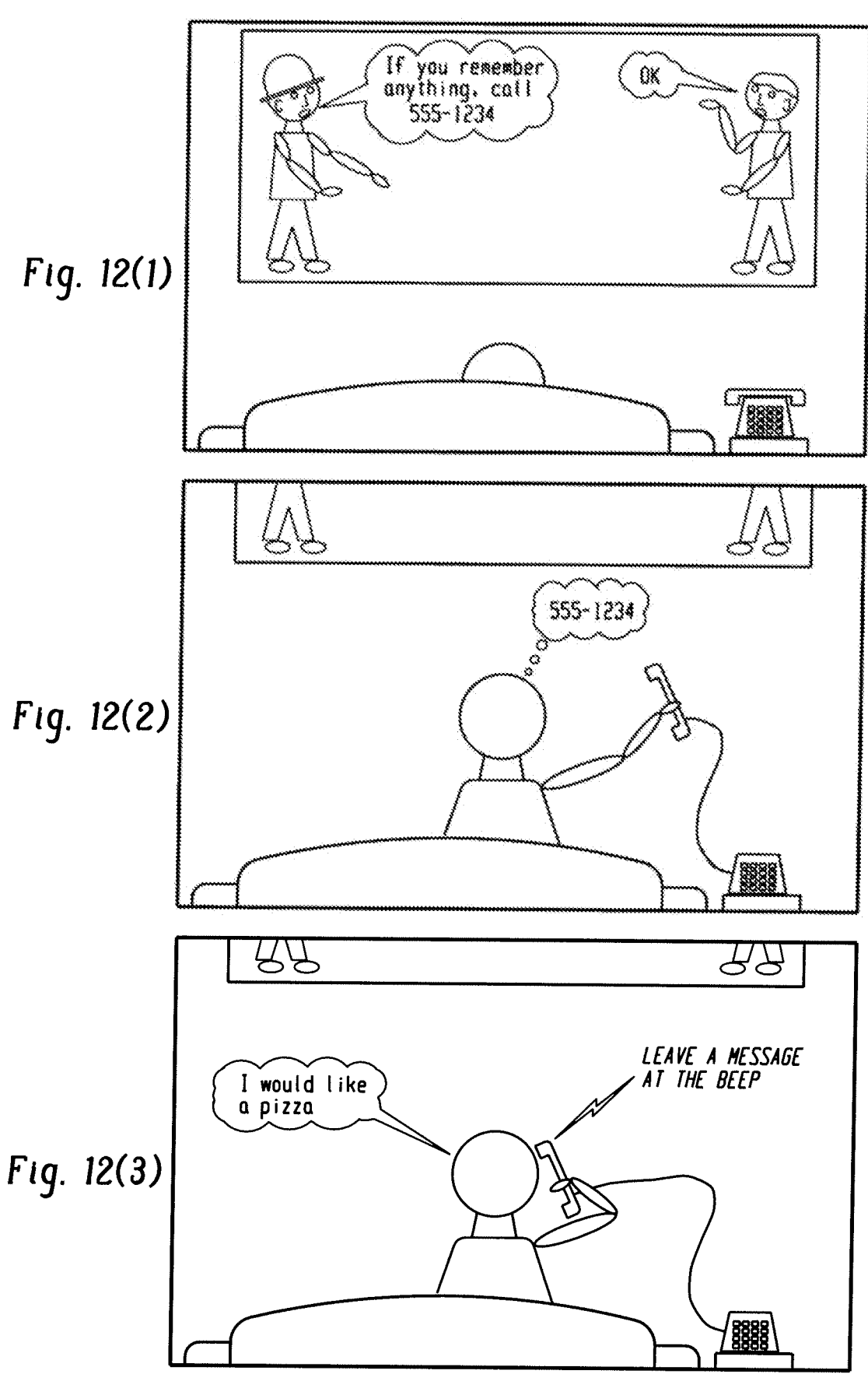
FIGS. 12(1)-(6) depicts an example user viewing experience where content stream is transformed based on an inbound communication trigger from a user generated voice telephone message.
Figure 12:
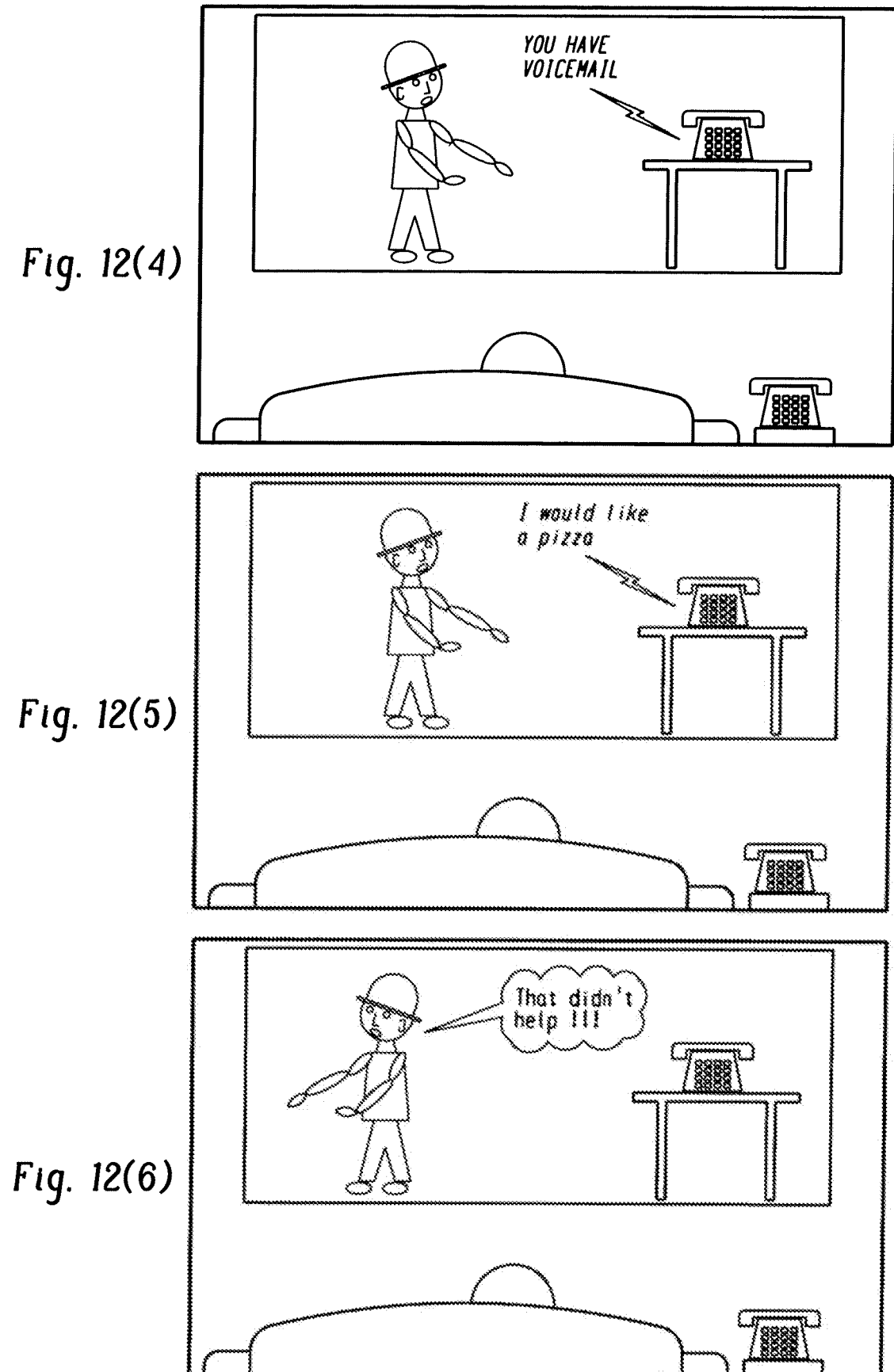

FIG. 12 depicts an example user viewing experience where content stream is transformed based on an inbound communication trigger from a user generated voice telephone message. More specifically, the content is transformed, but in a way that does not supplement the story. In cell 1, the user observes a detective character speaking with a potential witness and giving instructions on how to create an investigative lead. The user, observing these instructions calls the number via voice telephone, which generates an inbound communication trigger for the system. This inbound communication trigger generates a transformed content stream on the telephone channel which is delivered to the user via the voice channel. This transformed content prompts the user to leave a message in cell 3, to which the user responds with the message "I would like a pizza," which is, of course, irrelevant to the story line in play at the time. The content stream is then transformed in three ways. In the first transformation shown in cell 4, a video clip showing the checking of voicemail is inserted into the content stream and second transformation shown in cell 5, the recorded user's voice has been merged into the audio channel of the content stream. The third transformation in cell 6 is that the content stream plays the video clip where the detective ignores the message and the content stream continues to play as if the user never made the call.

This written description uses examples to disclose the invention, including the best mode, and also to enable a person skilled in the art to make and use the invention. The patentable scope of the invention may include other examples. For example, while the initial content portion provided to the user in the examples of FIGS. 7A-12 comprise video content, the initial content portion could comprise many other media types, such as audio, text, etc. As a further example, the systems and methods may include data signals conveyed via networks (e.g., local area network, wide area network, Internet, combinations thereof, etc.), fiber optic media, carrier waves, wireless networks, etc. for communication with one or more data processing devices. The data signals can carry any or all of the data disclosed herein that is provided to or from a device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including, by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to one other.

In some implementations, an insider can be any third-party who exhibits an interest in one or more of the following: processing, marketing, promotion, management, packaging, merchandising, fulfillment, delivery, distribution, licensing, or enforcement of content and/or content-related data. In some implementations, an insider can be considered a content provider. A content provider is anyone who exhibits an interest in distributing, licensing, and/or sub-licensing content and/or content-related data. A content provider can include, but is not limited to, a distributor, a sub-distributor, and a licensee of content and/or content-related data. In some implementations, a content provider can perform any and all functions associated with the systems and methods provided herein. It should be understood, that any and all functions performed by a content creator can also be performed by a content provider.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

It is claimed:

1. A computer-implemented method of providing content, comprising:

providing a prompt for control signals including user defined content;

accessing a base version of the content, wherein the base version of the content comprises a plurality of pre-existing content items;

processing the user defined content to determine (i) whether the base version of the content can be transformed to include the user defined content and (ii) whether the user defined content is related to the base version of the content;

when said processing determines (i) that the base version content can be transformed and (ii) that the user defined content is not related to the base version of the content, generating dynamic content, wherein generating the dynamic content comprises incorporating the user defined content into one or more of the pre-existing content items;

controlling transmission based on the control signals, wherein controlling transmission includes transmitting one or more of the plurality of pre-existing content items and the dynamic content.

2. The method of claim 1, wherein the user defined content is image content or video content.

3. The method of claim 1, wherein said processing comprises performing image recognition on the user defined content to determine whether the base version of the content can be transformed to include the user defined content.

4. The method of claim 1, further comprising:

identifying a location in the base version of the content to incorporate the user defined content into the base version of the content.

5. The method of claim 1, wherein the items of pre-existing content comprise pre-existing image content or video content.

* * * * *